United States Patent
Ohki et al.

[11] Patent Number: 5,666,169
[45] Date of Patent: Sep. 9, 1997

[54] PARALLEL PROCESSOR APPARATUS HAVING MEANS FOR PROCESSING SIGNALS OF DIFFERENT LENGTHS

[75] Inventors: Mitsuharu Ohki, Tokyo; Takao Yamazaki, Kanagawa; Masuyoshi Kurokawa, Kanagawa; Akihiko Hashiguchi, Kanagawa, all of Japan

[73] Assignee: Sony Corporation, Tokyo, Japan

[21] Appl. No.: 519,719

[22] Filed: Aug. 28, 1995

[30] Foreign Application Priority Data

Aug. 31, 1994 [JP] Japan .................. 6-207805

[51] Int. Cl.$^6$ .................. H04N 5/46; H04N 7/12
[52] U.S. Cl. .................. 348/721; 348/426; 348/555; 395/26; 395/27; 395/800.13; 395/800.16
[58] Field of Search .................. 348/385, 388, 348/705, 518, 426, 571, 720, 721, 19, 701, 555, 556, 558; 395/21, 24, 26, 27, 800; H04N 5/14, 7/12, 5/46

[56] References Cited

U.S. PATENT DOCUMENTS

| | | | |
|---|---|---|---|
| 4,656,592 | 4/1987 | Spaanenburg et al. | 395/800 |
| 5,115,309 | 5/1992 | Hang | 398/388 |
| 5,130,797 | 7/1992 | Murakami et al. | 348/416 |
| 5,187,575 | 2/1993 | Lim | 348/555 |
| 5,249,047 | 9/1993 | Aoki et al. | 358/135 |
| 5,510,842 | 4/1996 | Phillips et al. | 348/426 |
| 5,598,545 | 1/1997 | Childers et al. | 395/800 |

FOREIGN PATENT DOCUMENTS

| | | | |
|---|---|---|---|
| 0 210 434 | 2/1987 | European Pat. Off. | G06F 15/66 |
| 0 422 964 | 4/1991 | European Pat. Off. | G06F 15/80 |

OTHER PUBLICATIONS

IEEE Transactions on Circuits and Systems for Video Technology, Mar. 1991, USA, vol. 1, No. 1, ISSN 1051-8215, 1050-8215, pp. 35-41, Tamitani I et al "A Real-Time HDTV Signal Processor: HD-VSP".

Proceedings of the IEEE 1990 Custom Integrated Circuits Conference (Catalog No. 90CH2860-5, Boston, MA, USA, May 13-16, 1990; 1990; New York, NY, USA, IEEE, pp. 17.3/1-4; Childers J. et al, "SVP: Serial Video Processor".

Journal of Parallel and Distributed Computing, Jun. 1994, USA, vol. 21, No. 3, ISSN 0743-7315, pp. 323-333, Lignon W B III et al 'Evaluating multigauge architectures for computer vision'.

*Primary Examiner*—John K. Peng
*Assistant Examiner*—Jeffrey Murrell
*Attorney, Agent, or Firm*—William S. Frommer; Alvin Sinderbrand

[57] ABSTRACT

To provide a parallel processor apparatus which can perform processing with a good efficiency on signals comprised of data of different lengths. A parallel processor configured by a serial connection of a first parallel processor and a second parallel processor having n number of individual processors and (m-n) number of individual processors. For signals comprised of data of a length, serving as the unit of processing, of m or less and n or more, these parallel processors are connected and used as a single parallel processor apparatus which performs processing equivalent to that by a conventional parallel processor apparatus. For signals comprised of data of a length of n or less, these parallel processors are independently used to perform pipeline processing and thereby perform two times the amount of processing of that performed by a conventional parallel processor apparatus.

8 Claims, 8 Drawing Sheets

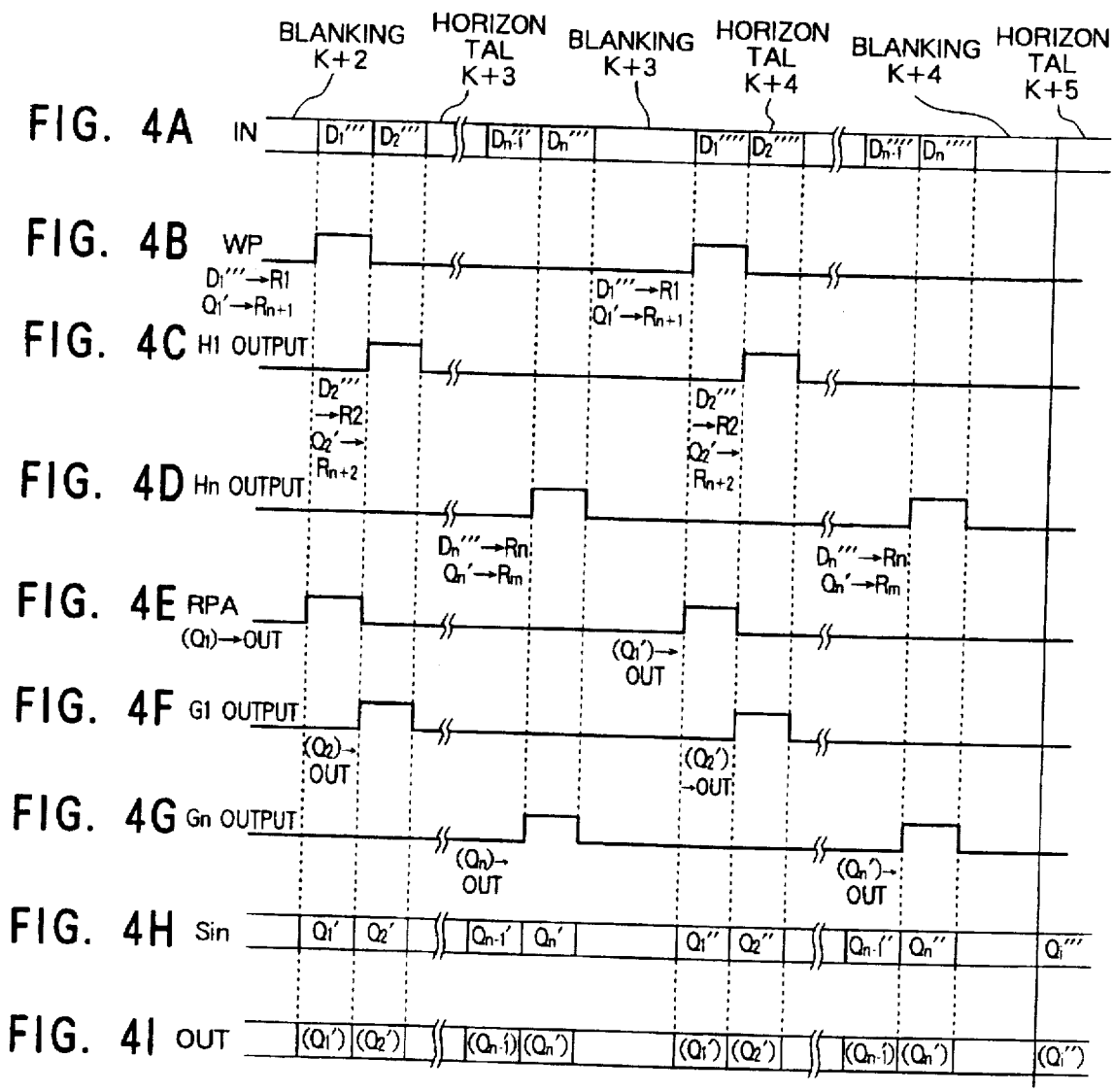

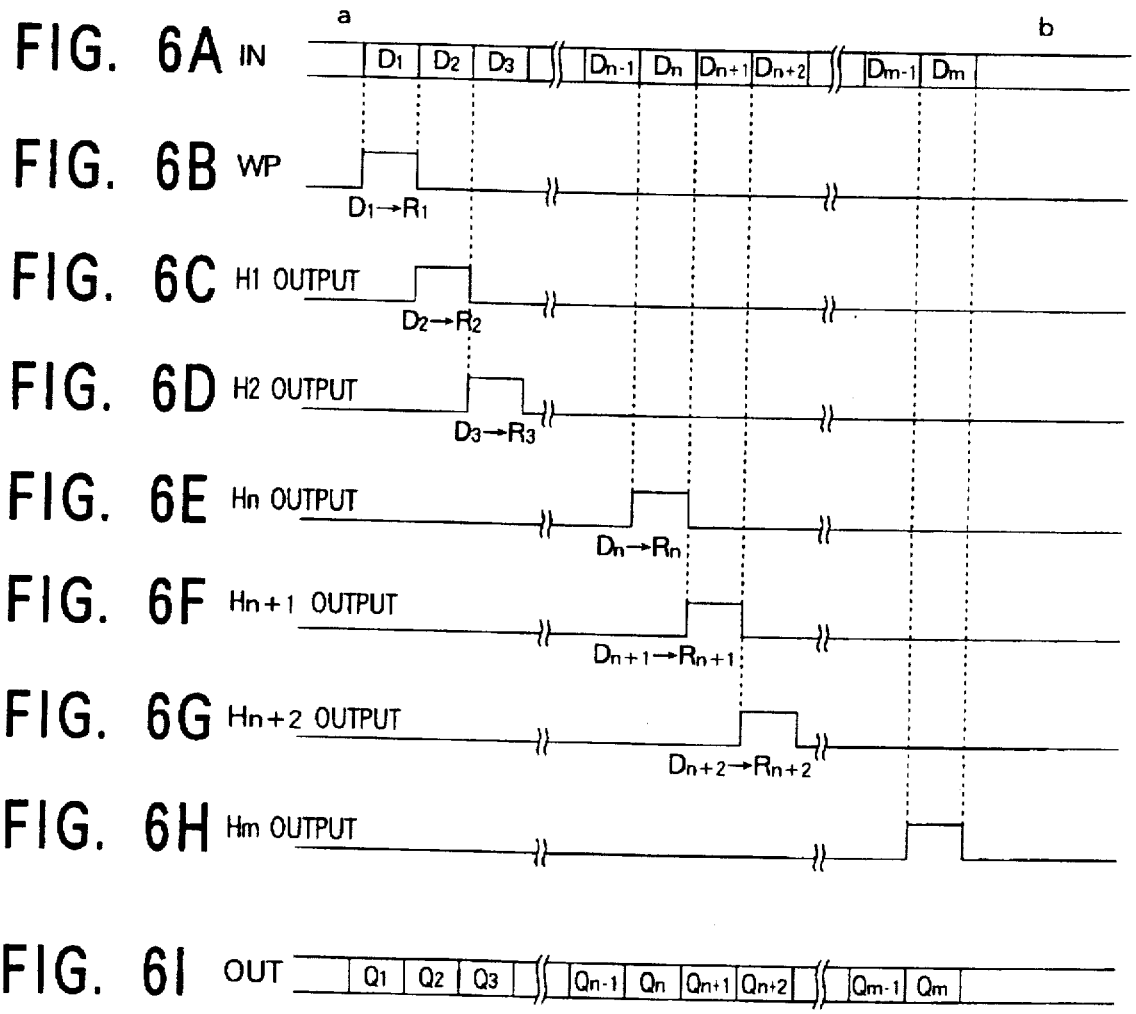

5,666,169

PARALLEL PROCESSOR APPARATUS HAVING MEANS FOR PROCESSING SIGNALS OF DIFFERENT LENGTHS

BACKGROUND OF THE INVENTION

1. Field of the Invention

The present invention relates to a parallel processor apparatus for performing high speed digital processing on a video signal, etc.

2. Description of the Related Art

As an apparatus for performing digital processing at a high speed on a video signal of the digital format, for example, there is known the parallel processor apparatus disclosed in Childere, J. et al.,"SVP: SERIAL VIDEO PROCESSOR/Proceedings of the IEEE 1990 CUSTOM INTEGRATED CIRCUITS CONFERENCE, pp. 17.3.1 to 17.3.4".

Below, an explanation will be made of the apparatus (SVP processing apparatus) disclosed in the above-described document referring to FIG. 1 and FIG. 7.

First, the configuration of the structure of the parallel processor 8 will be explained referring to FIG. 1. FIG. 1 is a view of the configuration of a conventional parallel processor.

The parallel processor 8 is a parallel processor apparatus having m number of individual processors the $80_1$ to $80_m$ and is configured so as to convert the, for example, the 8-bit word configuration data of pixels (pixel value $D_i$, i=1, 2, ... m, the same in the explanation of the related art below) of the serially input video signal to parallel data for every horizontal period (one line's worth) by registers R1 to Rm, perform digital processing on these pixel values $D_i$ in the individual processors $80_1$ to $80_m$, convert the results $Q_i$ of the processing to serial data again by the registers R1 to Rm, and output the same from an output terminal OUTT.

The individual processors $80_1$ to $80_m$ are provided in the same number as the number m of pixels included in one line and corresponding to the pixels. Each is constituted by a register (Ri) $806_i$, registers (Rij) $808_i$, $810_i$, $812_i$, an individual delay element (Gi) $802_i$, an individual delay element (Hi) $804_i$, an arithmetic and logic unit (ALUi) $814_i$, a switch (Ui) $816_i$, switch (Si) $818_i$, switch (Vi) $826_i$, switch (Ti) $828_i$, switches (Sij) $820_i$, $822_i$, $824_i$, and switches (Tij) $840_i$, $842_i$ and $844_i$ (j=0, 1, 2, the same for the following).

The individual delay elements (Gi) $802_i$ are serially connected. The individual delay elements (Gi) $802_i$ give to the read pointer signal RP input from the input terminal PRT of the parallel processor 8 exactly a delay of a time corresponding to the time during which one pixel of the video signal is input.

The individual delay elements (Hi) $804_i$ are serially connected. The individual delay elements (Hi) $804_i$ give to the write pointer signal WP input from the input terminal PRT of the parallel processor 8 a delay time corresponding to one pixel of the video signal.

The registers (Ri) $806_i$ are each a register having for example an 8-bit width, having an input terminal which is connected via a switch (Ui) $816_i$ to the signal INT of the parallel processor 8 and via the switch (Ti) $818_i$ to the write bit line WBi of the arithmetic and logic unit (ALUi) $814_i$, and having an output terminal which is connected via the switch (Vi) $826_i$ to the output terminal OUTT of the parallel processor 8 and via the switch (Ti) $828_i$ to the read bit line RBi of the arithmetic and logic unit (ALUi) $814_i$.

The register (Ri) $806_i$ holds the pixel value $D_i$ input from the input terminal INT of the parallel processor 8 via the switch (Ui) $816_i$ or the result of processing $Q_i$ input from the write bit line WBi of the arithmetic and logic unit (ALUi) $814_i$ via the switch (Ti) $818_i$ and outputs the held data via the switch (Vi) $826_i$ to the output terminal OUTT of the parallel processor 8 or via the switch (Ti) $828_i$ to the read bit line RBi of the arithmetic and logic unit (ALUi) $814_i$.

The switch (Ui) $816_i$ outputs the pixel value $D_i$ from the input terminal INT of the parallel processor 8 to the register (Ri) $806_i$ for holding only in a case where the write pointer signal WP is asserted.

The switch (Si) $818_i$ writes the result of processing $Q_i$ from the arithmetic and logic unit (ALUi) $814_i$ in the register (Ri) $806_i$ only in a case where the write signal WW supplied from an address decoder 850 is asserted.

The switch (Vi) $826_i$ reads the data held in the register (Ri) $806_i$ and outputs the same to the output terminal OUTT of the parallel processor 8 only in a case where a write pointer signal WP is asserted.

The switch (Ti) $828_i$ outputs the data held in the register (Ri) $806_i$ to the read bit line RBi of the arithmetic and logic unit (ALUi) $814_i$ only in a case where a read signal RW supplied from the address decoder 850 is asserted.

The individual delay element (Gi) $802_i$, individual delay element (Hi) $804_i$, register (Ri) $806_i$, switch (Ui) $816_i$, switch (Si) $818_i$, switch (Vi) $826_i$, and switch (Ti) $828_i$ constitute the shift register (SR) 82.

The registers (Rij) $808_i$, $810_i$, and $812_i$ hold the result $Q_i$ of processing of the arithmetic and logic unit (ALUi) $814_i$ or the pixel value $D_i$, which are supplied via the switches (Sij) $820_i$, $822_i$ and $824_i$ and the switch (Ui) $816_i$, respectively, and output the held data to the output terminal OUTT of the parallel processor 8 via the switches (Tij) $840_i$, $842_i$, and $844_i$ and the switch (Vi) $826_i$. That is, the registers (Rij) $808_i$, $810_i$, and $812_i$ operate as the registers which store the data in relation to the processing of the arithmetic and logic unit (ALUi) $814_i$, for example, the pixel values $D_i$ of the current frame and previous frame, an intermediate result of the processing, etc.

The switches (Sij) $820_i$, $822_i$, and $824_i$ write the result $Q_i$ of processing of the arithmetic and logic unit (ALUi) $814_i$ or pixel value $D_i$ in the registers (Rij) $808_i$, $810_i$, and $812_i$ only in a case where the write signals WW0, WW1, and WW2 supplied from the address decoder 850 are asserted, respectively.

The switches (Tij) $840_i$, $842_i$, and $844_i$ read the data held in the registers (Rij) $808_i$, $810_i$, and $812_i$ only in a case where the write signals RW0, RW1, and RW2 supplied from the address decoder 850 are asserted, respectively, and output the same to the output terminal OUTT of the parallel processor 8 via the switch (Vi) $826_i$.

The registers (Rij) $808_i$, $810_i$, and $812_i$, switches (Sij) $820_i$, $822_i$, and $824_i$, and switches (Tij) $840_i$, $842_i$, and $844_i$ constitute the register group $84_i$.

The arithmetic and logic unit (ALUi) $814_i$ reads the pixel value $D_i$ or the data stored in the register group $84_i$ etc. from the read bit line RBi, performs the processing, for example, an intra-frame movement detection processing, and outputs the result $Q_i$ of processing thereof or intermediate result to the register group $84_i$ or the output terminal OUTT of the parallel processor 8 from the write bit line WBi.

Here, the read bit line RBi is the read bit line of the arithmetic and logic unit (ALUi) $814_i$, which arithmetic and logic unit (ALUi) $814_i$ can read the data stored in the register (Ri) $806_i$ and register group $84_i$ by suitably controlling the switch (Ti) $828_i$ and switches (Tij) $840_i$, $842_i$, and $844_i$ via the address decoder 850.

Also, the output terminal OUTT is a write bit line of the arithmetic and logic unit (ALUi) $814_i$, which the arithmetic and logic unit (ALUi) $814_i$ can write the data of the result of processing $Q_i$, etc. in the register (Ri) $806_i$ and register group $84_i$ by suitably controlling the switch (Si) $818_i$ and switches (Sij) $820_i$, $822_i$, and $824_i$ via the address decoder 850.

Further, the arithmetic and logic unit (ALUi) $814_i$ has data buses $x_i$ and $Y_{i+1}$ for performing processing utilizing the data of the register groups $84_{i+1}$ and $84_{i-1}$ of adjoining individual processors $80_{i+1}$ and $80_{i-1}$, respectively.

The data bus $X_i$ is used for reading the data from the register group $84_{i+1}$ by the arithmetic and logic unit (ALUi) $814_i$, while the data bus $Y_{i+1}$ used for reading the data from the register group $8_{i-1}$ by the arithmetic and logic unit (ALUi) $814_i$.

That is, the control circuit 852 controls the arithmetic and logic unit (ALUi+1) $814_{i+1}$ and makes the same read the data stored in the register group $84_{i+1}$ via the output terminal RBi+1 and to output the same from the arithmetic and logic unit (ALUi+1) $814_{i+1}$ to the arithmetic and logic unit (ALUi) $814_i$ via the data bus $X_i$.

Also, conversely, the control circuit 852 controls the arithmetic and logic unit (ALUi) $814_i$ and makes the same read the data stored in the register group $84_i$ via the output terminal RBi and to output the same from the arithmetic and logic unit (ALUi) $814_i$ to the arithmetic and logic unit (ALUi) $814_{i+1}$ via the data bus $Y_{i+1}$. Note that there is no arithmetic and logic unit (ALUi) $814_i$ which should be connected to the data bus $Y_i$, and therefore a numerical value 0 is input to the data bus $Y_1$.

By these data buses $X_i$ and $Y_{i+1}$, it is also possible for the arithmetic and logic unit (ALUi) $814_i$ to perform processing by using the data stored in the register group $84_{i+1}$.

The control circuit (C) 852 produces an address signal ADRS and a control signal CTRL for controlling the arithmetic and logic units (ALUi) $814_i$ and outputs the same to the arithmetic and logic units (ALUi) $814_i$ and the address decoder 850.

The address decoder 850 decodes the address signal ADRS produced by the control circuit 852, produces the write signals WW, WW0, WW1, and WW2 and the read signals RW, RW0, RW1, and RW2, outputs the same to the registers (Ri) $806_i$ and the register groups $84_i$, and controls these switches.

Below, the operation of the parallel processor 8 will be explained referring to FIG. 7. FIG. 7 is a view explaining the content of processing of the parallel processor.

As shown in the processing of [S11] in the horizontal period k, [T1], the pixel value $D_i$ of the video signal of the horizontal period k is serially input from the input terminal INTof the parallel processor 8. Simultaneously with the first pixel value $D_i$ being input to the input terminal INT, the read pointer signal RP is asserted and input to the input terminal RPT.

The asserted read pointer signal RP is given a delay at the individual delay elements (Gi) $802_i$ whenever the pixel value $D_i$ is input to the input terminal INT and then is supplied to the switch (Vi) $826_i$.

The switch (Ui) $816_i$ is closed when the read pointer signal RP supplied from the individual delay element (Gi) $802_{i-1}$ is asserted and writes the pixel value $D_i$ in the corresponding register (Ri) $806_i$. Accordingly, as shown in the processing of [S11], at the time of the ending of the horizontal period k, the pixel value $D_i$ of the horizontal period k is stored in all of the registers (Ri) $806_i$. The shift register (SR) 82 as a whole stores one line's (1H) worth of the pixel value $D_1$.

Next, as shown in the processing of [S12] in the horizontal blanking period k shown in [T2], the control circuit 852 generates a predetermined address signal ADRS, asserts the read signal RW and write signal WW0 at the address decoder 850, and controls the switches (Ti) $828_i$ and (SiO) $820_i$ to close them.

By the above operation, the reading and writing of the data with respect to the registers of the register group $84_i$ of the arithmetic and logic unit (ALUi) $814_i$ become possible.

Next, in the horizontal period k+1 shown in [T3], as shown in the processing of [S13] and [S14], the control circuit 852 produces a predetermined address signal ADRS, asserts the read signals RW0 to RW2 and the write signals WW0 to WW2 in the address decoder 850, makes the switches (Sij) $820_i$, $822_i$, and $824_i$ and switches (Tij) $840_i$, $842_i$, and $844_i$ close, and enables the reading and writing of the registers (Rij) $808_i$, $810_i$, and $812_i$ by the arithmetic and logic unit (ALUi) $814_i$.

Also, as shown in the processing of [S13], also in the horizontal period k+1, similar to the horizontal period k, the control circuit 852 stores the pixel value $D_i$ of the horizontal period k+1 input from the input terminal INT in the register (Ri) $806_i$. Simultaneously, as in the processing of [S14], the control circuit 852 controls the arithmetic and logic unit (ALUi) $814_i$, performs processing by using the data stored in the registers (Rij) $808_i$, $810_i$, and $812_i$, and returns the result of processing $Q_i$ thereof to (Rij) $810_i$.

Next, in the horizontal blanking period k+1 in [T4], as in the processing of [S15], the control circuit 852 produces a predetermined address signal ADRS, asserts the read signal RW1 and write signal WWin the address decoder 850, and makes the switches (Tij) $842_i$ and switch (Ti) $828_i$ close. Subsequently, the control circuit 852 controls the arithmetic and logic unit (ALUi) 814 and makes it record the result of processing $Q_1$ stored in (Ril) 810i in the register (Ri) 806i via the read bit line RBi, arithmetic and logic unit (ALUi) $814_i$, and the write bit line WBi.

Next, in the horizontal period k+2 in [TS], as shown in the processing of [S16] to [S18], similar to the horizontal period k, the read pointer signal RP is asserted in the input terminal RPT, it sequentially is given a delay by the individual delay elements (Gi) 802i, and the resultant data is output to the switch (Vi) 826i. The switch (Vi) 826i sequentially outputs the result of processing Qi stored in the register (Ri) 806i to the output terminal OUTT of the parallel processor 8. Accordingly, one line's worth of the result of processing Qi of the individual processor 80i is sequentially output serially from the output terminal OUTT with the same data rate as that for the pixel value Di.

Further, as shown in the processing of the horizontal blanking period k+2 to horizontal blanking period k+3 shown in [T6] to [TS], in the horizontal periods k+1, k+2, . . . , also for the pixel value Di input to the parallel processor 8, the above-mentioned process lugs are carried out in the parallel processor 8, and the results of processing Qi thereof are sequentially output from the output terminal OUTT.

Note that, the operation of the parallel processor 8 is common with the second operation of the processing for the pixel value Di of a video signal of the HDTV system of the parallel processor 1 of the present invention which will be mentioned later by referring to FIG. 7.

In the above explained parallel processor 8, it is sufficient if each there is one address decoder 850 and control circuit 852 each with respect to all individual processors $80_i$.

Namely, the parallel processor 8 is a parallel processor of an SIMD (single instruction multiple data) system having the same number of processor elements (individual processors $80_i$) as the number m of pixels of one horizontal period, that is, one frame period (1H).

In the processing of a video signal, usually identical processing is carried out with respect to all pixel values Di, and therefore the processing can be carried out without problem by the SIMD system. Also, it is sufficient if the parallel processor 8 of the SIMD system be provided with the address decoder 850 and control circuit 852 in common for the individual processors 80i, and therefore there is the advantage that the circuit scale becomes small.

While the number of pixels of one horizontal period of a video signal according to conventional systems, for example, the NTSC, is about 1,000, the number of pixels of one horizontal period of a video signal of the HDTV system is about 2,000. The SVP processing apparatus is configured so as to process one horizontal period's worth of pixel values in one horizontal period, and therefore the number of the individual processors 80i of the SVP processing apparatus must also be 2,000.

According to the current techniques for production of semiconductor devices, it is possible to make the number of the individual processors 80i of the SVP processing apparatus about 2,000. However, in a parallel processor 8, frequently both a video signal according to the conventional system and a video signal according to the latest system are subjected to the processing. Accordingly, there is a problem in that waste occurs in the circuit.

More specifically, where a video signal of the HDTV system is processed by using an SVP processing apparatus constituted by providing 2,000 individual processors so that a video signal of the HDTV system can also be processed, all individual processors will be used for the processing and therefore no waste will occur. Conversely, where processing of a video signal of the NTSC system is carried out by the same apparatus, 1,000 individual processors $80_i$ will not be used, and there is then the problem such that waste will occur.

That is, where types of signals of data comprised of different lengths which serve as the unit of processing are handled in an SVP processing apparatus, it is necessary to provide a number of processors 80i corresponding to the type of data of the longest length. Such an SVP processing apparatus has a problem that it becomes over powerful with respect to a signal comprised of data of a shorter length than this.

SUMMARY OF THE INVENTION

An object of the present invention is to provide a parallel processor apparatus which can perform processing with a high efficiency when processing a signal comprised of data of a short length, which serves as the unit of processing, among a plurality of types of signals to be processed by the parallel processor apparatus, by using the individual processors remaining among the individual processors provided corresponding to a signal comprised of data of the longest length.

Another object of the present invention is to provide a parallel processor apparatus which can perform a more complex and higher degree processing than the conventional apparatus when the length of data to be processed is the axle.

So as to achieve the above-described objects, the parallel processor apparatus of the present invention provides a parallel processor apparatus which performs processing on periodical input signals comprised of data of different lengths per period, includes a plurality of individual processing unit groups, each of which is provided with exactly a predetermined number of individual processing units for performing processing for every type of data; processing units are configured so that exactly a number of the individual processing units are connected in series to enable processing of the data of one period of an input signal by connecting in series said individual processing circuit groups and forming the plurality of individual processing units perform the same processing; and the aforesaid respective individual processing units are configured so as to accept corresponding data in the aforesaid input signal which is periodically input and perform the predetermined processing for each the period and perform the processing on the input signal for the every processing unit.

Preferably, where a plurality of the processing units are configured, these plurality of processing units are serially connected, and each of the processing units is constituted so as to perform the predetermined processing for every period and output the result of the processing to the processing unit connected at a next stage.

Preferably, the plurality of processing units divide a desired processing among them and each perform one part thereof so that the plurality of processing units as a whole perform the desired processing.

Preferably, the individual processing unit is configured so as to enable an exchange of data with the adjoining individual processing units.

Preferably, the individual processing unit has a register means and a processing means. The register means accepts the corresponding data among the input signals input at a first timing of each period or the results of processing of the individual processing units of a previous stage and outputs the accepted data to the processing means at a second timing after the first timing; the processing means performs the processing at the first timing of the next period and outputs the result of the processing to the register means at the second timing of the next period; and the register means successively outputs the results of said input the processing so as to follow the output of the result of the processing of the register means of the previous stage.

Preferably, the input signal is a video signal of a serial format; the data of the video signal is pixel data of the pixels of one horizontal period's worth of said video signal; the first timing of the period is one horizontal period; and the second timing of the period is one horizontal blanking period.

The data input means of an individual processing unit group divides the input signal input in the serial format to the parallel processor apparatus in the individual processing unit group of the foremost stage or the input signal serially input from an earlier positioned individual processing unit group among the individual processing unit groups other than that of the foremost stage into the smallest units of data constituting the input signal and supplies the same to the corresponding individual processing units. Note that, the input signal is a video signal of for example an NSTC system and HDTV system, and the smallest unit of the data constituting the input signal is for example the data (pixel value) of each pixel of the video signal. Each of the individual processing units of an individual processing unit group performs the same processing with respect to the supplied data and supplies the results of processing to the data output means.

The data output means of the individual processing unit group converts the results of processing of the individual processing units of the individual processing unit group to an output signal of the serial format and outputs the resultant data. A plurality of individual processing unit groups are serially connected to configure a processing unit. The individual processing units of the processing unit receive as input the corresponding input signals and perform processing on them to enable processing of input signals of data of bit lengths not able to be processed by the individual processing unit groups alone. Also, where an input signal is comprised of data of a length which can be processed by one or a fraction of total number of individual processing unit groups included in the parallel processor, a processing unit is configured comprised of one individual processing unit group or a plurality of individual processing unit groups and is made to perform so-called pipeline processing where the results of processing of an earlier positioned (previous stage) processing unit is used as the input signal of the later positioned (later stage) processing unit, thereby enabling more complex and sophisticated processing in comparison with a conventional parallel processor apparatus.

According to the present invention, there is also provided a parallel processor apparatus including: a plurality of first shift register circuits which sequentially shift the input data of a serial format and convert the same to data of a parallel format; a plurality of processing circuits which respectively perform predetermined processing with respect to the corresponding the data of a parallel format and output the same as data of a parallel format; a second shift register circuit which sequentially shifts the data output from the processing circuits, converts the same to data of a serial format, and outputs the resultant data; and a first selector circuit which inputs at least one part of the data output from the second shift register means to the corresponding the first shift register circuits.

According to the present invention, there is further provided a parallel processor apparatus including: a plurality of first shift register circuits which sequentially shift first serial data of a serial format and convert the same to first parallel data of a parallel format;, and sequentially shift second parallel data and convert the same to second serial data of a serial format a plurality of processing circuits which respectively perform predetermined processing with respect to the corresponding the first parallel data of a parallel format and output the same as third parallel data of a parallel format; and a selector circuit which inputs at least one part of the second serial data output from the first shift register circuits to corresponding the first shift register circuits, the third parallel data being input to the first shift register circuits, as the second parallel input data.

BRIEF DESCRIPTION OF THE DRAWINGS

The above objects and features and other objects and features of the present invention will be more apparent with reference to the accompanying drawings, in which:

FIG. 4A to 4I are views explaining the timing of a first operation of the parallel processor of the present invention shown in FIG. 2 and FIG. 3, in which FIG. 4A shows a pixel value $D_i$ to be input to an input terminal IN; FIG. 4B shows the waveform of a write pointer signal WP to be input to an input terminal WP of the first parallel processor; FIG. 4C shows the waveform of the output signal of an individual delay element H1; FIG. 4D shows the waveform of the output signal of an individual delay element Hn; FIG. 4E shows the waveform of a read pointer signal RPA to be input to an input terminal RPA of the first parallel processor; FIG. 4F shows the waveform of the output signal of an individual delay element G1; FIG. 4G shows the waveform of the output signal of an individual delay element Gn; FIG. 4H shows a result of processing $Q_i$ which is output from a selector Sin of the first parallel processor; and FIG. 4I shows a result of processing ($Q_i$) which is output from the output terminal OUT of the second parallel processor;

FIGS. 5A and 5B are views explaining the content of processing of the parallel processor of the present invention shown in FIG. 2 and FIG. 3, in which FIG. 5A is a view explaining the content of first processing of the first parallel processor shown in FIG. 2; and FIG. 5B is a view explaining the content of first processing of the second parallel processor shown in FIG. 3, FIGS. 6A to 6I are views explaining the timing of a second operation of the parallel processor of the present invention shown in FIG. 2 and FIG. 3, in which FIG. 6A shows a pixel value $D_i$ input from an input terminal IN of the first parallel processor; FIG. 6B shows the waveform of the write pointer signal WP input from an input terminal WP of the first parallel processor; FIG. 6C shows the waveform of the output signal of the individual delay element H1; FIG. 6D shows the waveform of the output signal of the individual delay element H2; FIG. 6E shows the waveform of the output signal of the individual delay element Hn; FIG. 6F shows the waveform of the output signal of the individual delay element Hn+1; FIG. 6G shows the waveform of the output signal of the individual delay element Hn+2; FIG. 6H shows the waveform of the output signal of the individual delay element Hm; and FIG. 6I shows the results of processing $Q_i$ and $Q_p$ output from the output terminal OUT of the second parallel processor;

DESCRIPTION OF THE PREFERRED EMBODIMENTS

Below, an embodiment of the parallel processor apparatus of the present invention will be explained referring to FIG. 2 to FIG. 7.

Figure 1:
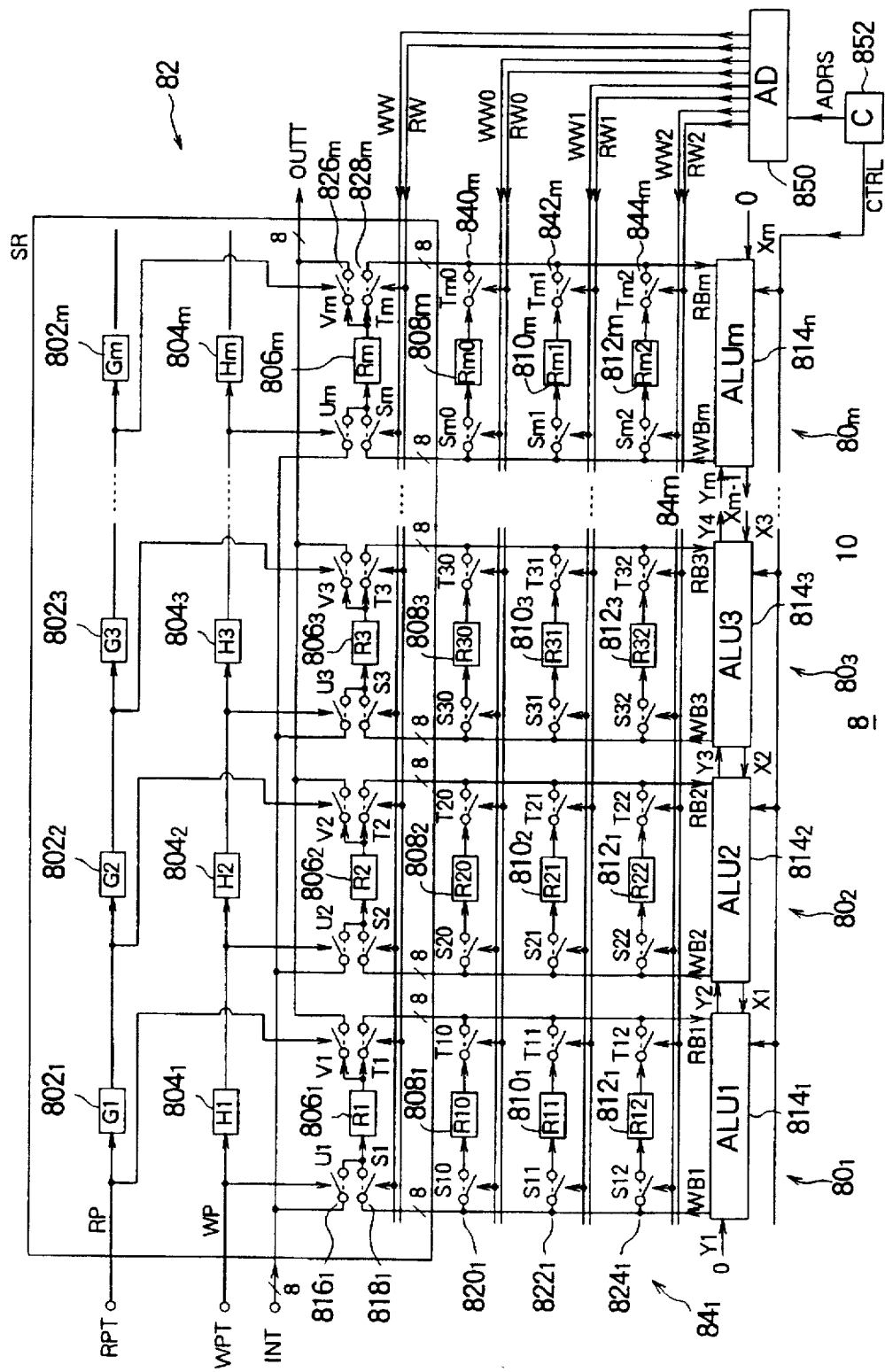
FIG. 1 is a view of the configuration of a conventional parallel processor.
Figure 2:
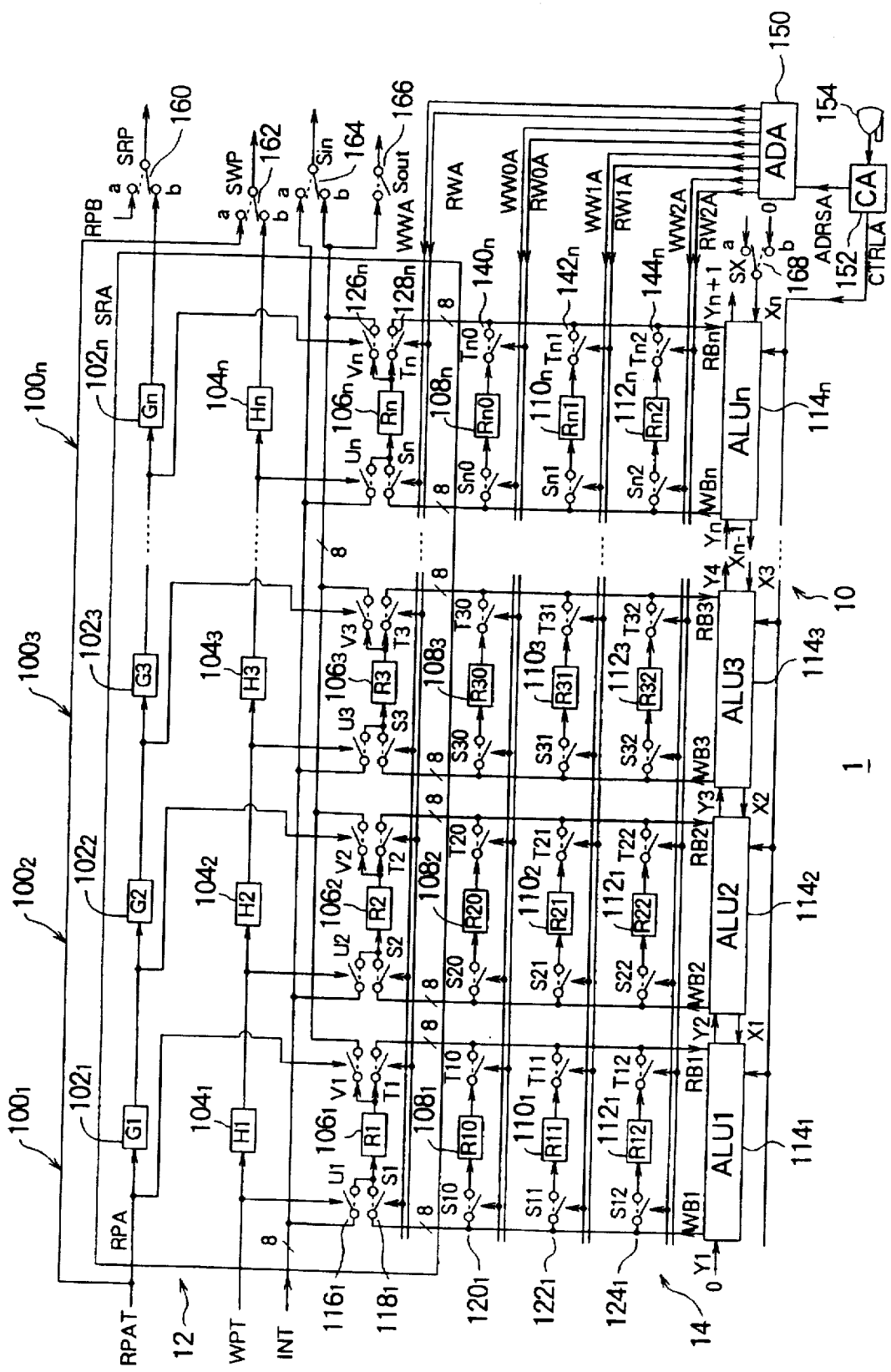
FIG. 2 is a view of the configuration of a first parallel processor of the parallel processor according to a first embodiment of the present invention.
Figure 3:
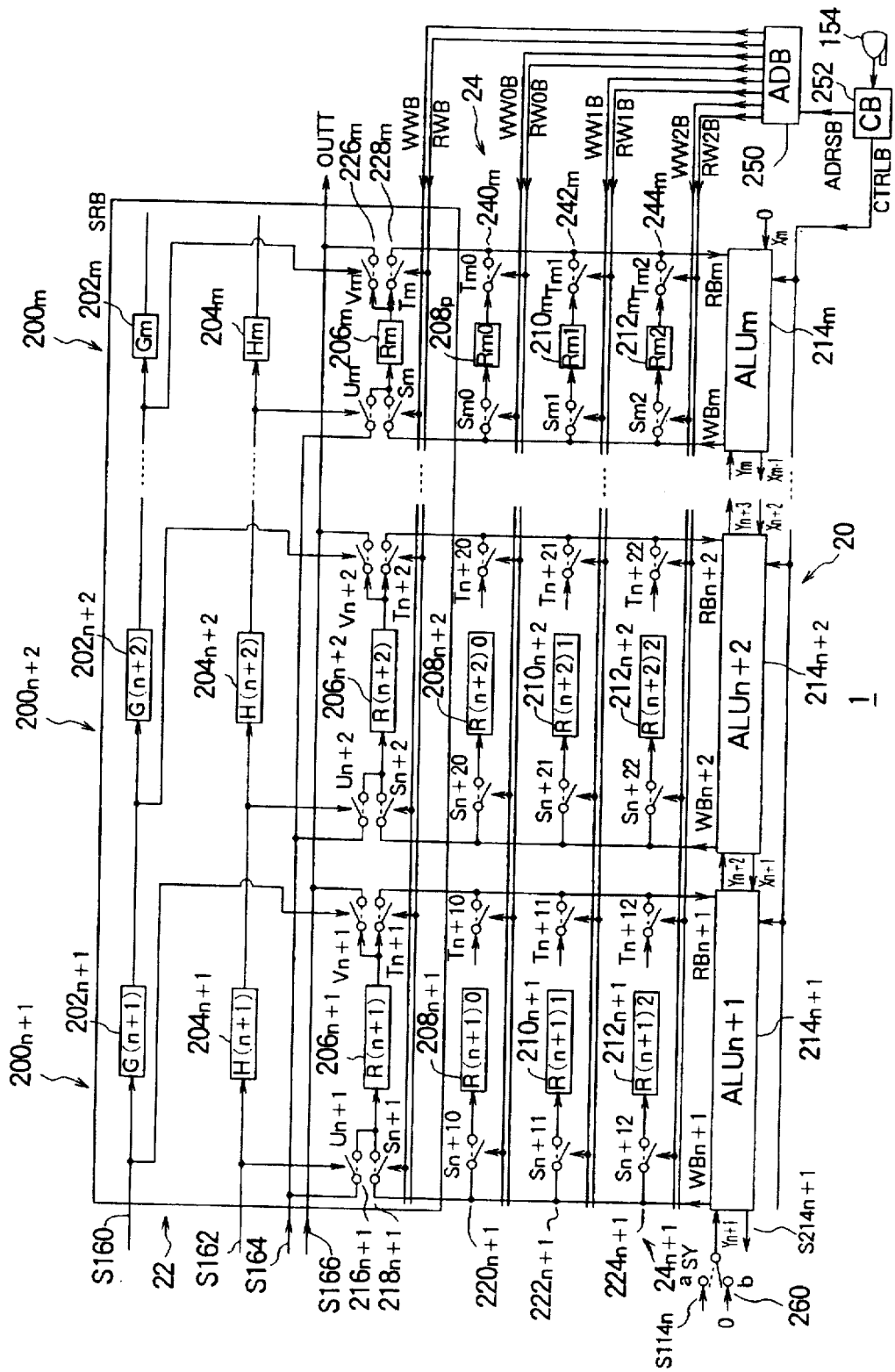
FIG. 3 is a view of the configuration of a second parallel processor according to the first embodiment of the present invention.

For convenience of the illustration, a parallel processor 1 of the present invention is illustrated divided into two, i.e. a first parallel processor 10 and a second parallel processor 20. FIG. 2 is a view showing the configuration of the first parallel processor 10 of the parallel processor 1 according to a first embodiment of the present invention; and FIG. 3 is a view showing the configuration of a second parallel processor 20 of the parallel processor 1 according to the first embodiment of the present invention. Note that, the symbols (S160) to (S214n+1) in FIG. 2 and FIG. 3 denote the signal connections between the first parallel processor 10 and the second parallel processor 20.

The parallel processor 1 shown in FIG. 2 and FIG. 3 performs processing such as intraframe movement detection processing on video signals of a plurality of types of digital formats, such as video signals of the NTSC system and HDTV system.

The parallel processor I has the configuration of a parallel processor apparatus of two SIMD (single instruction multiple data) systems having n number of individual processors (processor elements) $100_i$ (i=1, 2, . . . , n, the same for the following) and (m-n) number of individual processors $200_p$ (p=n+1, n+2, . . . , m, the same for the following), that is, a configuration of a serial connection of the first parallel processor 10 and second parallel processor 20, and is configured so that the connection thereof can be changed by the setting of a selector according to whether the data which is input is a video signal of the NTSC system or a video signal of the HDTV system.

Here, m and n are integers and have a relationship of for example $i \leq n \leq m/2 < m$. Where the parallel processor 1 processes video signals of the NTSC system and the HDTV system, here, for example m is about 2,000, n is about 1,000, and m/2=n stands.

By serially connecting these two parallel processors and performing processing on the video signals in parallel by them, the parallel processor 1 can perform processing equivalent to that by the above-mentioned SVP processing apparatus (parallel processor 8) in one horizontal period on a video signal of the HDTV system comprised of data having a long length serving as the unit of processing and can perform processing of an amount twice that of the parallel processor 8 on a video signal of the NTSC system.

That is, where a video signal of the NTSC system is subjected to the processing, in the parallel processor 8, only the part corresponding to the first parallel processor 10 of the parallel processor 1 effectively operates. The part corresponding the second parallel processor 20 does not perform effective processing. Contrary to this, in the parallel processor 1, the first parallel processor 10 and the second parallel processor 20 perform pipeline processing and thereby perform more sophisticated processing by effectively utilizing also the second parallel processor 20.

First, the configuration of the first parallel processor 10 of the parallel processor 1 of the present invention will be explained referring to FIG. 2.

The first parallel processor 10 is a parallel processor of the SIMD system having individual processors $100_i$, corresponding to the n number of pixels included in one horizontal period (one line or 1H) of for example a video signal of the NTSC system or a half horizontal period of a video signal of the HDTV system.

The individual processors $100_i$ to $100_n$ are provided in the same number as the number of the pixels n included in one line of a video signal of the NTSC system and corresponding to the pixels. Each is constituted by a register (Ri) $106_i$, registers (Rij) $108_i$, $110_i$, $112_i$, an arithmetic and logic unit (ALUi) $114_i$, a switch (Ui) $116_i$, switch (Si) $118_i$, switch (Vi) $126_i$, switch (Ti) $128_i$, switches (Sij) $120_i$, $122_i$, and $122_i$, and switches (Tij) $140_i$, $142_i$, and $144_i$ (j=0, 1, 2).

Individual delay elements (Gi) $102_i$ are serially connected. The individual delay elements (Gi) $102_i$ each gives to the read pointer signal RPA input from the input terminal RPAT of the parallel processor 1 a delay of exactly a time during which the one pixel's worth of the results of processing is output. The read pointer signal RPA output from an individual delay element (Gn) $102_n$ is output via the selector (SRP) 160 to the individual delay element (G(n+1)) $202_{n+1}$ of the second parallel processor 20 ((S160) of FIG. 3).

The individual delay elements (Hi) $104_i$ are serially connected. The individual delay elements (Hi) $104_i$ each give to the write pointer signal WP input from the input terminal WPT of the parallel processor 1 a a delay of exactly a time during which one pixel's worth of the pixel values of the video signal is input.

The write pointer signal WP output from an individual delay element (Hn) $104_n$ is output via the selector (SWP) 162 to the individual delay element (Hi) $204_1$ of the second parallel processor 20 ((S162) of FIG. 3).

The registers (Ri) $106_i$ are each a register having for example an 8-bit width, having an input terminal which is connected via the switch (Ui) $116_i$ to the input terminal INT of the parallel processor 1, connected via the switch (Ti) $118_i$ to the write bit line WBi of the arithmetic and logic unit (ALUi) $114_i$, and having an output terminal which is connected via the switch (Vi) $126_i$ to the selector (SRP) 160 of the parallel processor 1 and via the switch (Ti) $128_i$ to the read bit line RBi of the arithmetic and logic unit (ALUi) $114_i$.

The register (Ri) $106_i$ holds the pixel value $D_i$ input from the input terminal INT of the parallel processor 1 via the switch (Ui) $116_i$ or the result of processing $Q_i$ input from the write bit line WBi of the arithmetic and logic unit (ALUi) $114_i$ i via the switch (Ti) $118_i$ and outputs the held data via the switch (Vi) $126_i$ to the selector (Sin) 164 of the first parallel processor 10 or via the switch (Sout) 166 and the switch (TI) $128_i$ to the read bit line RBi of the arithmetic and logic unit (ALUi) $114_i$.

The switch (Ui) $116_i$ outputs the pixel value $D_i$ from the input terminal INT of the first parallel processor 10 to the register (Ri) $106_i$ for holding only in a case where the write pointer signal WP is asserted (to logical value "1").

The switch (Si) $118_i$ writes the result of processing $Q_i$ from the arithmetic and logic unit (ALUi) $114_i$ in the register (Ri) $106_i$ only in a case where the write signal WWA supplied from the address decoder (ADA) 150 is asserted.

The switch (Vi) $126_i$ reads the data held in the register (Ri) $106_i$ and outputs the same to the selector (Sin) 164 of the first parallel processor 10 and the switch (Sour) 166 only in a case where the write pointer signal WP is asserted.

The switch (Ti) $128_i$ outputs the data held in the register (Ri) $106_i$ to the read bit line RBi of the arithmetic and logic unit (ALUi) $114_i$ only in a case where the read signal RWA supplied from the address decoder 150 is asserted.

Note that, the individual delay element (Gi) $102_i$, individual delay element (Hi) $104_i$, register (Ri) $106_i$, switch (Ui) $116_i$, switch (Si) $118_i$, switch (Vi) $126_i$, and the switch (Ti) $128_i$ constitute the shift register (SRA) 12.

The registers (Rij) $108_i$, $110_i$, and $112_i$ hold the result of processing $Q_i$ of the arithmetic and logic unit (ALUi) $114_i$ or the pixel value $D_i$ input via the switches (Sij) $120_i$, $122_i$, and $124_i$ and the switch (Ui) $116_i$ And output the held data to the selector (SWP) 162 and the switch (Sour) 166 of the first parallel processor 10 via the switches (Tij) $140_i$, $142_i$, and $144_i$ and the switch (Vi) $126_i$. That is, the registers (Rij) $108_i$, $110_i$, and $112_i$ operate as registers which store the data in relation to the processing of the arithmetic and logic units (ALUi) $114_i$, for example, the pixel values $D_i$ of the current frame and previous frame and an intermediate result of the processing.

The switches (Sij) $120_i$, $122_i$, and $124_i$ write the results of processing $Q_i$ or pixel values $D_i$ of the arithmetic and logic units (ALUi) $114_i$ in the registers (Rij) $108_i$, $110_i$, and $112_i$ only in a case where the write signals WW0A, WW1A, and WW2A supplied from the address decoder 150 are asserted, respectively.

The switches (Tij) $140_i$, $142_i$, and $144_i$ read the data held in the registers (Rij) $108_i$, $110_i$, and $112_i$ only in a case where the write signals RWOA, RW1A, and RW2A supplied from the address decoder 150 are asserted, respectively, and output the same to the selector (SIn) 164 and the switch (Sour) 166 of the first parallel processor 10 via the switch (Vi) $126_i$.

The registers (Rij) $108_i$, $110_i$, and $112_i$, switches (Sij) $120_i$, $122_i$, and $124_i$, and switches (Tij) $140_i$, $142_i$, and $144_i$ constitute the register group $14_i$. Note that, although the number of the registers in the register group $14_i$ was set to three for simplification of illustration, in practical use, usually the number of registers of the register group $14_i$ is about 128 to 1024.

The selector (SRP) 160 selects the signal RPB (a) or the output signal (b) of the individual delay element (Gi) $102_n$ by the control of the control circuit 152 and outputs the same to the second parallel processor 20 (FIG. 3 (S160)).

The selector (SWP) 162 selects the read pointer signal RPA (a) or the output signal (b) of the individual delay element (Hn) $104_n$ by the control of the control circuit 152 and outputs the same to the second parallel processor 20 (FIG. 3 (S162)).

The selector (Sin) 164 selects the pixel value $D_i$ (a) input from the input terminal INT or the result of processing $Q_i$ (b) output from the respective individual processors $100_i$ by the control of the control circuit 152 and outputs the same to the second parallel processor 20 (FIG. 3 (S164)).

The switch (Sour) 166 opens or closes under the control by the control circuit 152 and outputs the result of processing $Q_i$ to the second parallel processor 20 when closed (FIG. 3 (S166)).

The selector (SX) 168 selects the input signal (a) or numerical value 0 (b) from the arithmetic and logic unit (ALUn+1) $214_{n+1}$ under the control of the control circuit 152 and outputs the selected data to the arithmetic and logic unit (ALUi) $114_i$ (FIG. 3 (S214n+1)).

The arithmetic and logic unit (ALUi) $114_i$ reads the pixel value $D_i$ or the data stored in the register group $14_i$ etc. from the read bit line RBi, performs processing, for example, intraframe movement detection processing, and outputs the result of processing $Q_i$ thereof or an intermediate result to the register group $14_i$ or the selector (Sin) 164 and switch (Sour) 166 of the first parallel processor 10 from the write bit line WBi.

Here, the read bit line RBi is the read bit line of the arithmetic and logic unit (ALUi) $114_i$, which the arithmetic and logic unit (ALUi) $114_i$ can read the data stored in the register (Ri) $106_i$ and the register group $14_i$ by suitably controlling the switch (Ti) $128_i$ and switches (Tij) $140_i$, $142_i$, and $144_i$ via the address decoder 150. Also, the write bit line WBi is a write bit line of the arithmetic and logic unit (ALUi) $114_i$, which arithmetic and logic unit (ALUi) $114_i$ can write the data such as the result of processing $Q_i$ in the register (Ri) $106_i$ and the register group $14_i$ by suitably controlling the switch (Si) $118_i$ and switches (Sij) $120_i$, $122_i$, and $124_i$ via the address decoder 150.

Further, the arithmetic and logic unit (ALUi) $114_i$ has data buses $X_i$ and $Y_{i+1}$ for performing processing utilizing the data of the register groups $14_{i+1}$ and $14_{i-1}$ of adjoining individual processors $10_{i+1}$ and $10_{i-1}$, respectively. The data bus $X_i$ is used for reading the data from the register group $14_{i+1}$ by the arithmetic and logic unit (ALUi) $114_i$, and the data bus $Y_{i+1}$ is used for reading the data from the register group $14_{i-1}$ by the arithmetic and logic unit (ALUi) $114_i$. Namely, the control circuit 152 controls the arithmetic and logic unit (ALUi+1) $114_{i+1}$ to make the same read the data stored in the register group $14_{i+1}$ via the write bit line WBi+1 and causes output of the same from the arithmetic and logic unit (ALUi+1) $114_{i+1}$ to the arithmetic and logic unit (ALUi) $114_i$ via the data bus $X_i$. Also, conversely, the control circuit 152 controls the arithmetic and logic unit (ALUi) $114_i$ to make the same read the data stored in the register group $14_i$ via the write bit line WBi and causes output of the same from the arithmetic and logic unit (ALUi) $114_i$ to the arithmetic and logic unit (ALUi) $114_{i+1}$ via the data bus $Y_{i+1}$.

Note that, as shown in FIG. 2, there is no arithmetic and logic unit (ALUi) $114_i$ which should be connected to the data bus $Y_i$, and therefore a numerical value 0 is input to the data bus $Y_1$. Also, the data bus $x_n$ to the arithmetic and logic unit (ALUn) $114_n$ is connected via the selector (XY) 168 to the arithmetic and logic unit (ALUn+1) $214_{n+1}$ (S214n+1) of FIG. 3) or the signal indicating "0", and the data bus $Y_{n+1}$ is connected to the arithmetic and logic unit (ALUn+1) $214_{n+1}$ ((S114n) of FIG. 3).

By these data buses $X_i$ and $Y_{i+1}$, it is also possible for the arithmetic and logic unit (ALUi) $114_i$ to perform the processing by using the data stored in the register group $14_{i+1}$.

The control circuit (CA) 152 produces an address signal ADRS and a control signal CTRLA for controlling the arithmetic and logic unit (AhUi) $114_i$ and outputs the same to the arithmetic and logic units (ALUi) $114_i$ and the address decoder 150. Also, the control circuit (CA) 152 controls the selector (SRP) 160, selector (SWP) 162, selector (Sin) 164, selector (SX) 168, and the switch (Sout) 166 to change an internal configuration of the parallel processor 1.

The address decoder 150 decodes the address signal ADRS produced by the control circuit 152, asserts the write signals WWB, WWOB, WW1B, and WW2B and the read signals RWB, RWOB, RW1B, and RW2B, outputs the same to the registers (Ri) $106_i$ and the register groups $14_i$, and controls these switches and selectors.

The console 154 sets the information controlling the configuration of the connection between for example the first parallel processor 10 and the second parallel processor 20, that is, the connection of the selector (SRP) 160, selector (SWP) 162, selector (Sin) 164, selector (SX) 168, selector (SY) 260, the switch (Sout) 166, etc., in the control circuit 152 and the control circuit 252 of the second parallel processor 20 mentioned later by the input of data by the user of the parallel processor 1.

Next, an explanation will be made of the configuration of the second parallel processor 20 of the parallel processor 1 of the present invention referring to FIG. 3.

The second parallel processor 20 is a parallel processor apparatus of an SIMD signal having a configuration resembling that of the first parallel processor 10, that is, having individual processor $200_p$ corresponding to the n+1-th to m-th pixels included in one horizontal period of a video signal of for example the HDTV system or (m−n) number of pixels of a horizontal period different from the horizontal period of the pixel values $D_i$ which has been processed by the first parallel processor 10. Note that, as mentioned above, in the first embodiment, for example m−n=n.

Namely, the second parallel processor 20 performs processing on the result of processing $Q_i$ from the first parallel processor 10 or the pixel values $D_{n+1}$ to $D_m$ (hereinafter, the pixel values $D_{n+1}$ to $D_m$ are abbreviated as the pixel value $D_p$) input from the input terminal INT of the first parallel processor 10. Namely, the second parallel processor 20 performs processing for a part ($D_{n+1}$ to $D_m=D_p$) projected from the first parallel processor 10 among the pixel values $D_p$ of the HDTV system or performs the second processing for the first result of processing $Q_i$ performed for the pixel value $D_i$ at the first parallel processor 10 and outputs the resultant data as the result of processing $Q_p$.

The individual processors $200_{n+1}$ to $200_m$ are provided in a number exactly the same as the difference (m−n) between the number of pixels n included in one line of a video signal of the NTSC system and the number of pixels m included in one line of a video signal of the HDTV system and correspond to the respective n+1-th to m-th pixels. Each is constituted by an (Rp)$206_p$, registers (Rpj) $208_p$, $210_p$, and $212_p$, arithmetic and logic unit (ALUp) $214_p$, switch (Up) $216_p$, switch (Sp) $218_p$, switch (Vp) $226_p$, switch (Tp) $228_p$, switches (Spj) $220_p$, $222_p$, and $224_p$, and switches (Tpj) $240_p$, $242_p$, and $244_p$.

The individual delay elements (Gp) $202_p$ are serially connected. The individual delay elements (Gp) $202_p$ each give to the read pointer signal RPB input via the selector (SRP) 160 of the first parallel processor 10 or the output signal (signal SRP, (S160) of FIG. 3) of the individual delay element (Gn) $102_n$ a delay of exactly the time during which one pixel's worth of the results of processing $Q_i$ is output.

The individual delay elements (Hp) $204_p$ are serially connected. The individual delay elements (Hp) $204_p$ each give to the read pointer signal RPA input via the selector (SWP) 162 of the first parallel processor 10 or the output signal (signal WRP, (S162) of FIG. 3) of the individual delay element (Hn) $104_n$ a delay time corresponding to one pixel of the video signal.

The registers (Rp) $206_p$ are registers each having for example an 8-bit width, having an input terminal which is connected via the switch (Up) $216_p$ to the selector (Sin) 164 of the first parallel processor 10 (S164) of FIG. 3) and via the switch (Tp) $218_p$ to the write bit line WBp of the arithmetic and logic unit (ALUp) $214_p$, and having an output terminal which is connected via the switch (Vp) $226_p$ to the output terminal OUTT and via the switch (Tp) $228_p$ to the read bit line RBp of the arithmetic and logic unit (ALUp) $214_p$.

The register (Rp) $206_p$ holds the pixel value $D_p$ ((S166 of FIG. 3) input from the selector (Sin) 164 of the first parallel processor 10 via the switch (Up) $216_p$ or the result of processing $Q_p$ input from the write bit line WBp of the arithmetic and logic unit (ALUD) $814_p$ via the switch (Tp) $218_p$ and outputs the held data to the output terminal OUTT of the parallel processor I or the read bit line RBp of the arithmetic and logic unit (ALUp) $214_p$ via the switch (Tp) $228_p$.

The switch (Up) $216_p$ outputs the pixel value $D_p$ from the input terminal INT of the parallel processor 1 to the register (Rp) $206_p$ for holding only in a case where the write pointer signal WP is asserted.

The switch (Sp) $218_p$ writes the result of processing $Q_p$ from the arithmetic and logic unit (ALUp) $214_p$ in the register (Rp) $206_p$ only in a case where the write signal WWB input from the address decoder (ADB) 250 is asserted.

The switch (Vp) $226_p$ reads the data held in the register (Rp) $206_p$ only in a case where the write pointer signal WP is asserted and outputs the same to the output terminal OUTT.

The switch (Tp) $228_p$ outputs the data held in the register (Rp) $206_p$ to the read bit line RBp of the arithmetic and logic unit (ALUp) $214_p$ only in a case where the read signal RWB supplied from the address decoder 250 is asserted.

The individual delay element (Gp) $202_p$, individual delay element (Hp) $204_p$, register (Rp) $206_p$, switch (Up) $216_p$, switch (Sp) $218_p$, switch (Vp) $226_p$, and switch (Tp) $228_p$ constitute the shift register (SPB) 22.

The registers (Rpj) $208_p$, $210_p$, and $212_p$ hold the result of processing $Q_p$ of the arithmetic and logic unit (ALUp) $214_p$ or the pixel value $D_p$, which are input via the switch (Spj) $220_p$, $222_p$, and $224_p$ and the switch (Up) $216_p$, and outputs the held data via the switches (Tpj) $240_p$, $242_p$, and $244_p$ and the switch (vp) $226_p$ to the output terminal OUTT of the parallel processor 1.

That is, the registers (Rpj) $208_p$, $210_p$, and $212_p$ operate as registers storing the data concerning the processing of the arithmetic and logic unit (ALUp) $214_p$, for example, the pixel value $D_p$ of a current frame and previous frame and the intermediate result of the processing.

The switches (SDj) $220_p$, $222_p$, and $224_p$ write the results of processing $Q_p$ of the arithmetic and logic units (AnUi) $214_p$ or pixel values $D_p$ in the registers (Rpj) $208_p$, $210_p$, and $212_p$ only in a case where the write signals WW0B, WW1B, and WW2B supplied from the address decoder 250 are asserted.

The switches (Tpj) $240_p$, $242_p$, and $244_p$ read the data held in the registers (Rpj) $208_p$, $210_p$, and $212_p$ only in a case where the write signals RW0B, RW1B, and RW2B supplied from the address decoder 250 are asserted, respectively, and output the same to the output terminal OUTT of the parallel processor i via the switch (Vp) $226_p$.

The registers (Rpj) $208_p$, $210_p$, and $212_p$, switches (Sp) $220_p$, $222_p$, and $224_p$, and switches (Tpj) $240_p$, $242_p$, and $244_p$ constitute the register group $24_p$. Note that, as mentioned in the configuration of the first parallel processor 10, although the number of registers of the register group $24_p$ was set to three for the simplification of the illustration, in practical use, the number of registers of the register group $24_p$ becomes about 128 to 1024.

The arithmetic and logic unit (ALUp) $214_p$ reads the pixel value $D_p$ or the data stored in the register group $24_p$ etc. from the read bit line $RB_p$, performs the processing, for example, intra-frame movement detection processing, and outputs the result of processing $Q_p$ thereof or intermediate result to the register group $24_p$ or the output terminal OUTT of the parallel processor 1 from the write bit line WBp.

Here, the read bit line RBp is the read bit line of the arithmetic and logic unit (ALUp) $214_p$, which arithmetic and logic unit (ALUp) $214_p$ can read the data stored in the register (Rp) $206_p$ and register group $24_p$ by suitably controlling the switch (Tp) $228_p$ and switches (Tpj) $240_p$, $242_p$, and $244_p$ via the address decoder 250. Also, the write bit line WBp is a write bit line of the arithmetic and logic unit (ALUp) $214_p$, which arithmetic and logic unit (ALUp) $214_p$ can write the data of the result of processing $Q_p$, etc. in the register (Rp) $206_p$ and register group $24_p$ by suitably controlling the switch (Sp) $218_p$ and switches (Spj) $220_p$, $222_p$, and $224_p$ the address decoder 250.

Further, the arithmetic and logic unit (ALUp) $214_p$ has data buses $X_p$ and $Y_{p+1}$ for performing the processing utilizing the data of the register groups $24_{p+1}$ and $24_{p-1}$ of adjoining individual processors $20_{p+1}$ and $20_{p-1}$, respectively. The data buses $X_p$ and $Y_{p+1}$ are used for the same purpose as that for the data buses $X_i$ and $Y_{i+1}$ of the above-mentioned first parallel processor 10, that is, used for reading the data from the register group $24_{p+1}$ by the arithmetic and logic unit (ALUp) $214_p$, and the data bus $Y_{p+1}$ is used for reading the data from the register group $24_{p-1}$ by the arithmetic and logic unit (ALUp) $214_p$. Namely, the control circuit 252 controls the arithmetic and logic unit (ALUp+1) $214_{p+1}$ to make the same read the data stored in the register group $24_{p+1}$ via the write bit line WBp+1 and causes input of the same from the arithmetic and logic unit (ALUp+I) $214_{p+1}$ to the arithmetic and logic unit (ALUp) $214_p$ via the data bus $X_p$. Also, conversely, the control circuit 252 controls the arithmetic and logic unit (ALUp) $214_p$ to make the same read the data stored in the register group $24_p$ via the read bit line RBp and causes input of the same from the arithmetic and logic unit (ALUp) $214_p$ to the arithmetic and logic unit (ALUp+i) $214_{p+1}$ via the data bus $Y_{p+1}$.

Note that, as shown in FIG. 3, the data bus $Y_{n+1}$ of the arithmetic and logic unit (ALUn+1) $214_{n+1}$ is connected via the selector (SY) 260 to the data bus $Y_{n+1}$ (a) of the arithmetic and logic unit (ALUn) $114_n$ or the signal (b) representing the numerical value "0" ((S11An) of FIG. 3). Also, the data bus $x_n$ of the arithmetic and logic unit (ALUn+1) $214_{n+1}$ is connected to the arithmetic and logic unit (ALUn) $114_n$.

By these data buses $x_n$ and $y_{n+1}$, the data stored in the register group $14_i$ and the register group $24_p$ can be shared between the arithmetic and logic unit (ALUi) $114_i$ of the first parallel processor 10 and the arithmetic and logic unit (ALUp) $214_p$ of the second parallel processor 20.

The control circuit (CB) 252 produces the address signal ADRS and a control signal CTRLB for controlling the arithmetic and logic units (ALUp) $214_p$ and outputs the same to the arithmetic and logic units (ALUp) $214_p$ and the address decoder 250 and, at the same time, controls the selector (SY) 260.

The address decoder 250 decodes the address signal ADR8 produced by the control circuit 252, asserts the write signals WWB, WWOB, WW1B, and WW2B and the read signals RWB, RWOB, RW1B, and RW2B, supplies the same to the registers (Rp) $206_p$ and the register groups $24_p$, and controls these switches and selectors.

Among the above-mentioned constituent elements of the parallel processor 1, the first parallel processor 10 and the second parallel processor 20 correspond to the individual processing unit groups according to the present invention. Where they are not connected, the first parallel processor 10 and the second parallel processor 20 correspond to the processing units according to the present invention. Where they are connected, the first parallel processor 10 and the second parallel processor 20 together correspond to the processing unit according to the present invention.

In the first parallel processor 10 and the second parallel processor 20, the shift registers 12 and 22 correspond to the shift register, data input means, and data output means corresponding to the present invention, and the register group $14_i$ and arithmetic and logic unit (ALUi) $114_i$ and the register group $24_p$ and arithmetic and logic unit (ALUp) $214_p$ correspond to the individual processing units according to the present invention.

Below, an explanation will be made of the first operation of the parallel processor 1, that is, the operation where the parallel processor 1 performs processing for a video signal comprised of data of at least n length in one horizontal period, for example, a video signal of the NTSC system, referring to FIGS. 4A to 4I, FIGS. 5A and 5B.

FIGS. 4A to 4I are views explaining the timing of the first operation of the parallel processor 1 of the present invention shown in FIG. 2 and FIG. 3, in which FIG. 4A indicates a pixel value $D_i$ to be input to the input terminal INT; FIG. 4B indicates the waveform of the write pointer signal WP which is input to the input terminal WPT of the first parallel processor; FIG. 4C indicates the waveform of the output signal of the individual delay element (H1) $104_1$; FIG. 4D indicates the waveform of the output signal of the individual delay element (Hn) $104_n$; FIG. 4E indicates the waveform of the read pointer signal RPA to be input to the input terminal RPAT of the first parallel processor; FIG. 4F indicates the waveform of the output signal of the individual delay element (G1) $102_1$; FIG. 4G indicates the waveform of the output signal of the individual delay element (Gn) $102_n$; FIG. 4H indicates the result of processing $Q_i$ which is output from the selector (Sin) 164 of the first parallel processor 10; and FIG. 4I indicates the result of processing $(Q_i)$ which is output from the output terminal OUTT of the second parallel processor 20.

Figures 5A, 5B:
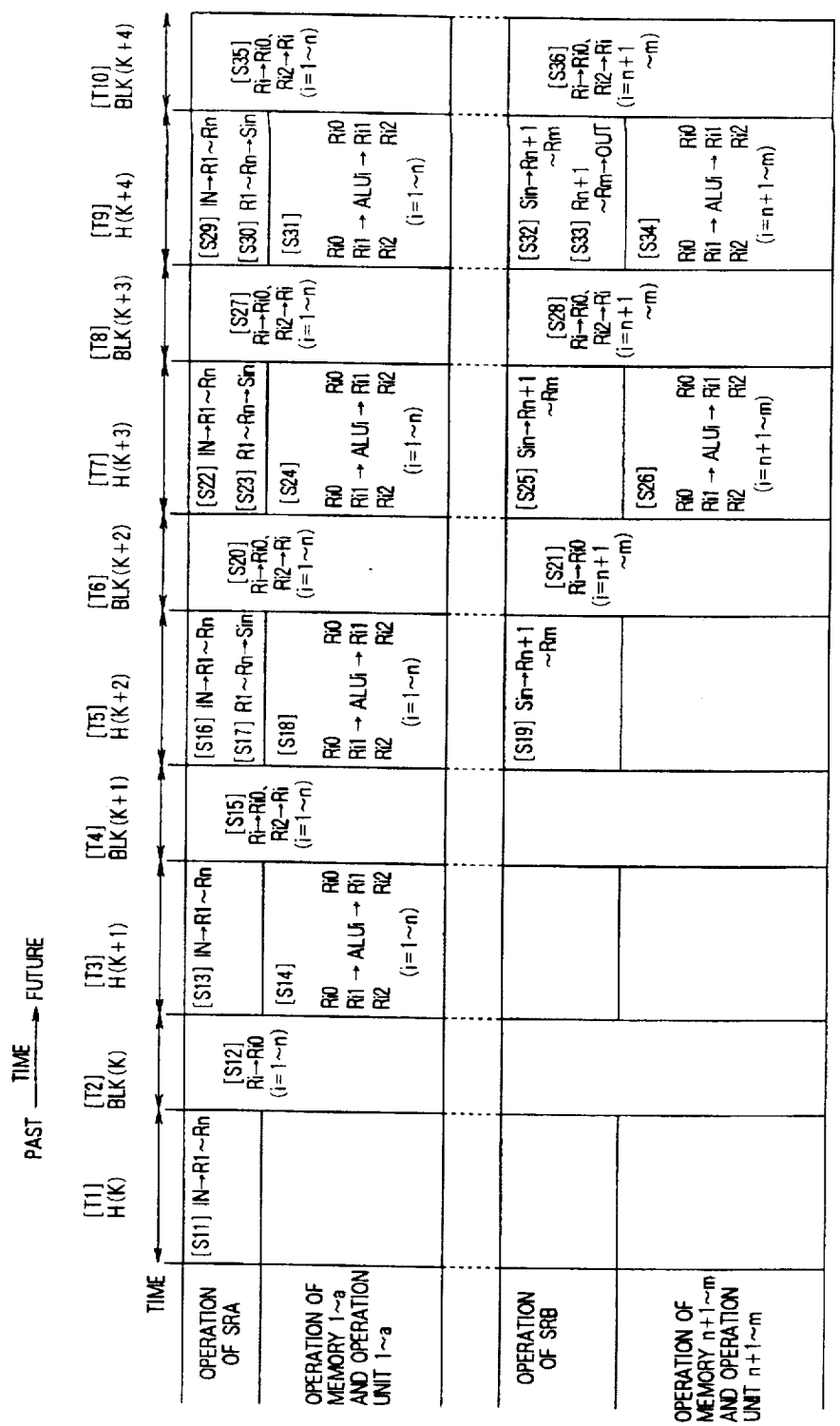

FIGS. 5A and 5B are views explaining the content of the processing of the parallel processor 1 of the present invention shown in FIG. 2 and FIG. 3; in which FIG. 5A is a view explaining the content of first processing of the first parallel processor 10 shown in FIG. 2; and FIG. 5B is a view explaining the content of first processing of the second parallel processor 20 shown in FIG. 3.

This first operation is one in which first processing is applied to the pixel values $D_i$ of the video signal of the NTSC system by the first parallel processor 10, and then these first results of processing $Q_i$ are sequentially output to the second parallel processor 20.

The second processing is further applied to the first results of processing $Q_i$ in the second parallel processor 20, and the results of processing $Q_p$ are output. That is, in the first operation, the first parallel processor 10 and the second parallel processor 20 perform the first processing and second processing mentioned later for the pixel values $D_i$ by pipeline processing. Note that, in the following explanation, the result of processing $Q_p$ of the second parallel processor 20 is described as the result of processing $(Q_i)$ obtained by further processing the first result of processing $Q_i$ of the first parallel processor 10.

First, an explanation will be made of the connection of the switches and selectors of the parallel processor 1 in the first operation.

Where the first operation is carried out, the selector (SRP) 160 of the first parallel processor 10 of the parallel processor i selects the contact point a shown in FIG. 2, selects the read pointer signal RPB, and outputs the same to the second parallel processor 20. Note that, the read pointer signal RPB is the same signal as the read pointer signal RPA. The selector (SWP) 162 of the first parallel processor 10 selects the contact point a side shown in FIG. 2, selects the read pointer signal RPA, and outputs the same to the second parallel processor 20. The selector (Sin) 164 selects the contact point b side shown in FIG. 2 and outputs the result of processing $Q_i$ of the first parallel processor 10 to the second parallel processor 20. The switch (Sour) 166 opens the contact point. Accordingly, the second parallel processor 20 sequentially receives as input the first results of processing $Q_i$ as the results obtained by performing the processing for the pixel values $D_i$ by the first parallel processor 10.

Also, the selector (SX) 168 of the first parallel processor 10 selects the contact point b side shown in FIG. 2 and outputs the numerical value "0" to the arithmetic and logic unit (ALUn) $114_n$ via the data bus $X_n$, while the selector (SY) 260 of the second parallel processor 20 selects the contact point b side shown in FIG. 3 and outputs the numerical value "0" to the arithmetic and logic unit (ALUn+1) $214_{n+1}$. Accordingly, between the arithmetic and logic unit (ALUn) $114_n$ of the first parallel processor 10 and the arithmetic and logic unit (ALUn+I) $214_{n+1}$ of the second parallel processor 20, the transmission and reception of the data via the data buses $X_n$ and $Y_{n+1}$ is not carried out, and the first parallel processor 10 and the second parallel processor 20 operate as independent parallel processor apparatuses. The connection of the switches and selectors is controlled by the control circuit 152 according to the set-up information output from the console 154.

First, an explanation will be made of the operation timing of the parallel processor i referring to FIGS. 4A to 4I.

As shown in FIG. 4A, the pixel value ($D_i''''$) of the horizontal period k+4 and the pixel value ($D_i'''$) of the horizontal period k+3 are sequentially input from the input terminal INT of the first parallel processor 10. Simultaneously with the input of the pixel values $D_i$ of the respective horizontal periods, as shown in FIG. 4B, the write pointer signal WP to be input to the input terminal WPT of the first parallel processor 10 is asserted. As shown in FIGS. 4C and 4D, the write pointer signal WP is given a delay exactly of a time during which one pixel is sequentially input to the parallel processor 1 by the individual delay element (Hi) $104_i$.

Where the write pointer signal WP which is output from the individual delay element (Hi) $104_i$ is asserted, the corresponding switch (Ui) $116_i$ is closed and the pixel values $D_i$ input from the input terminal INT are sequentially written in the register (Ri) $106_i$. Accordingly, in the horizontal periods k+3 and k+4 shown in FIG. 4A, as shown in FIGS. 4B to 4D, the pixel values $D_i'''$ and $D_i''''$ are sequentially written in the register (Ri) $106_i$ of the first parallel processor 10.

The control circuit 152 produces the predetermined address signal ADRSA, controls the address decoder 150 to make it generate the read signal RWA, and connects the switch (Ti) $128_i$ in the horizontal blanking periods k+3 and k+4 shown in FIG. 4A. Subsequently, the control circuit 152 makes the arithmetic and logic unit (ALUi) $114_i$ read the pixel values $D_i'''$ and $D_i''''$ written in the register (Ri) $106_i$ via the read bit line RBi.

Further, the control circuit 152 produces the predetermined address signal ADRSA and controls the address decoder 150, makes this generate the write signal WWOA, and connects the switch (SiO) $120_i$. Subsequently, the control circuit 152 controls the arithmetic and logic unit (ALUi) $114_i$ to make it sequentially write the pixel values $D_i'''$ and $D_i''''$ in for example a register (RiO) $108_i$ via the write bit line WBi and the switch (SiO) $120_i$.

In this way, the pixel values read into the first parallel processor 10 in a certain horizontal period are fetched into the register group $14_i$ in the next horizontal blanking period.

The pixel values $D_i'''$ and $D_i''''$ are respectively subjected to the predetermined processing (first processing) in the horizontal periods subsequent to the horizontal blanking periods k+3 and k+4 of FIG. 4A by the individual processor $100_i$ of the first parallel processor 10. On the other hand, in the horizontal periods k+3 and k+4 shown in FIG. 4A, the pixel values $D_i'''$ and $D''''$ of the horizontal periods k+2 and k+3 are subjected to processing by the individual processors $100_i$ and become the results of processing $Q_i''$ and $Q_i'''$.

In this way, the pixel values input to the first parallel processor 10 in a certain horizontal period are subjected to the first processing by the individual processor $100_i$ in the next horizontal period and become the first results of processing.

Here, the first processing by the individual processor $100_i$ is executed, as mentioned above, by having the control circuit 152 produce the address signal ADRSA corresponding to the content of the processing, control the address decoder 150 to make it produce the read signals RWA, RWOA, RWiA, RW2A, WWA, WWOA, WWIA, and WW2A, control the opening and closing of the switches (Sij) $120_i$, $122_i$, and $124_i$ and the switches (Tij) $140_i$, $142_i$, and $144_i$ to set up the data path between the registers (Rij) $108_i$, $110_i$, and $110_i$ and the arithmetic and logic unit (ALUi) $114_i$, control the arithmetic and logic unit (ALUi) $114_i$ to make the same perform the reading and writing of the data from and into the register group $14_i$, and control the arithmetic and logic units (ALUi) $114_i$ to makes all arithmetic and logic unit (ALUi) $114_i$ perform the same processing.

In a certain horizontal period, the result of processing of the first processing calculated by the individual processor $100_i$ is stored in for example the register (Ri2) $112_i$.

As shown in the processing in the horizontal blanking periods k+2, k+3, and k+4 shown in FIG. 4A, the control circuit 152 produces the predetermined address signal ADREA, controls the address decoder 150 and produces a read signal RW2A, closes the switch (Ti2) $144_i$, and controls the arithmetic and logic unit (ALUi) $114_i$ to makes the same read the first results of processing $Q_i'$, $Q_i''$, and $Q_i'''$ from the register (Ri2) $112_i$ to the register (Ri) $106_i$. At the same time, the control circuit 152 produces the predetermined address signal ADRSA, controls the address decoder 150 to produce the write signal WWA to close the switch (Si) $118_i$, and makes the register (Ri) $106_i$ write the first results of processing $Q_i'$, $Q_i''$, and $Q_i'''$.

Here, the first results of processing $Q_i'$, $Q_i''$ and $Q_i'''$ are results of processing produced by subjecting the pixel values $D_i'$ $D_i''$, and $D_i'''$ input to the first parallel processor 10 in the horizontal periods k+1 and k+2 not illustrated in the figures and k+3, respectively, to the first processing by the first parallel processor 10 in the horizontal period k+2 not illustrated in the figures and the horizontal periods k+3 and k+4.

In the next horizontal periods k+3, k+4, and k+5, the read pointer signal RPA to the input terminal RPAT of the first parallel processor 10 is asserted. This read pointer signal RPA is sequentially given a delay of exactly the time during which the result of processing corresponding to one pixel value $D_i$ is sequentially output by the individual delay element (Gi) $102_i$ as shown in FIGS. 4F and 4G.

When the output signal of the individual delay element (Gi) $102_i$ is asserted, as shown in FIG. 4H, the corresponding switches (Vi) $126_i$ are sequentially closed, the first results of processing $Q_i'$, $Q_i''$, and $Q_i'''$ are sequentially read from the register (Ri) $106_i$, and they are output to the selector (Sin) 164 and the switch (Sout) 166. Here, the switch (Sour) 166 is opened, and therefore the signal is not input to (S166) of the second parallel processor 20 shown in FIG. 3, and since the selector (Sin) 164 selects the contact point a side shown in FIG. 2, the first results of processing $Q_i'$, $Q_i''$, and $Q_i'''$ are sequentially input to (S164) of the parallel processor 20 shown in FIG. 3 in the horizontal periods k+3, k+4, and k+5.

Also, the selector (SWP) 162 selects the contact point a side shown in FIG. 2, and therefore the read pointer signal RPA is input also to (S162) of the second parallel processor 20 shown in FIG. 3. The read pointer signal RP is delayed exactly by the time during which one pixel value $D_i$ is input by the individual delay element (Hi) $104_i$. Accordingly, the output signal of the individual delay element (Hp) $204_p$ of the second parallel processor 20 is asserted at the same timing as that for the output signal of the individual delay element (Gi) $102_i$ shown in FIGS. 4F and 4G.

In the horizontal periods k+3, k+4, and k+5 shown in FIG. 4A, when the output signal of the individual delay element (Hp) 204$_p$ is asserted, the corresponding switch (Up) 216$_p$ is closed, and the first results of processing Q$_i$', Q$_i$", and Q$_i$'" input from the first parallel processor 10 are written in the switch (Rp) 206$_p$.

That is, in the horizontal periods k+3, k+4, and k+5 shown in FIG. 4A, the first results of processing Q$_i$', Q$_i$", and Q$_i$'" stored in the switch (Ri) 106$_i$ of the first parallel processor 10 are output from the first parallel processor 10 via the selector (Sin) 164 to the second parallel processor 20, and further written in the register (Rp) 206$_p$ of the second parallel processor 20.

Here, the operation of the second processing in the second parallel processor 20 will be explained. The second processing by the second parallel processor 20 is carried out by the same operation as that of the first processing in the first parallel processor 10.

The control circuit 252 produces the predetermined address signal ADRSB, controls the address decoder 250 to make it generate the read signal RWB, and connects the switch (Tp) 228$_p$ in the horizontal blanking periods k+2k, k+3, and k+4 shown in FIG. 3(A). Subsequently, the control circuit 252 makes the arithmetic and logic unit (ALUi) 214$_i$ read the first results of processing Q$_i$', Q$_i$", and Q$_i$'" written in the register (Rp) 206$_p$ via the read bit line RBi.

Further, the control circuit 252 produces the predetermined address signal ADRSB, controls the address decoder 250 to makes it generate the write signal WWOB, and connects the switch (Spj) 220$_p$. Subsequently, the control circuit 252 controls the arithmetic and logic unit (ALUi) 214$_i$ to make it sequentially write the results of processing Q$_i$', Q$_i$", and Q$_i$'" via the write bit line WBi and switch (Spj) 220$_p$ in for example a register (Rp0) 208$_p$.

In this way, the results of processing read into the second parallel processor 20 in a certain horizontal period are fetched into the register group 24$_i$ in the next horizontal blanking period.

The pixel values Q$_i$', Q$_i$", and Q$_i$'" are respectively subjected to the predetermined processing (second processing) by the individual processor 200$_p$ of the second parallel processor 20 in the horizontal periods k+4 and k+5 and the horizontal period k+6 not illustrated in FIG. 3 subsequent to the horizontal blanking periods k+3 and k+4 shown in FIG. 4A and the horizontal blanking period k+5 not illustrated in FIG. 4 and become second results of processing (Q$_i$'), (Q$_i$") and (Q$_i$'").

The first result of processing of the first parallel processor 10 input to the second parallel processor 20 for a certain horizontal period is subjected to the second processing by the individual processor 200$_p$ in the next horizontal period and becomes the second result of processing.

Here, the first processing according to the individual processor 200$_p$ is executed by having, as mentioned above, the control circuit 252 produce the address signal ADRSB corresponding to the content of the processing, control the address decoder 250 to make it produce the read signals RWB, RWOB, RWIB, RW2B, WWA, WWOB, WW1B, and WW2B, control the opening and closing of the switches (Spj) 220$_p$, 222$_p$, and 224$_p$ and switches (Tpj) 240$_p$, 242$_p$, and 244$_p$ to set up the data path between the registers (Rpj) 208$_p$, 210$_p$, and 212$_p$ and the arithmetic and logic unit (ALUp) 214$_p$, control the arithmetic and logic unit (ALUp) 214$_p$ to make it perform the reading and writing of the data from and to the register group 24$_p$, and control the arithmetic and logic units (ALUp) 214$_p$ to make all the arithmetic and logic units (ALUp) 214$_p$ perform the same processing.

Here, in the horizontal period k+3 shown in FIG. 4A, the second processing has been carried out for the first result of processing Q$_i$. The result of processing (Q$_i$) is stored in the register (Rp) 206$_p$ at the end of the horizontal period k+3.

In the horizontal blanking periods k+2, k+3, and k+4 shown in FIG. 4A, the control circuit 252 produces the predetermined address signal ADRSB, controls the address decoder 250 and produces the read signal RW2B to close the switch (Tp2) 244$_p$, controls the arithmetic and logic unit (ALUp) 214$_p$ to make it read the second results of processing (Q$_i$), (Q$_i$'), and (Q$_i$") from the register (Rp) 2112$_p$ and, at the same time, the control circuit 252 produces the predetermined address signal ADRSB, controls the address decoder 250, and produces the write signal WWB to close the switch (Sp) 218$_p$ to make it write the second results of processing (Q$_i$), (Q$_i$'), and (Q$_i$") in the register (Rp) 206$_p$.

Namely, as mentioned above, the results of processing (Q$_i$) to (Q$_i$'") are the second results of processing obtained by using the pixel values D$_i$ to D$_i$'" respectively input to the first parallel processor 10 as the first results of processing Q$_i$ to Q$_i$'" by the first parallel processor 10 and further applying the second processing to the first results of processing Q$_i$ to Q$_i$'" by the second parallel processor 20 and outputting the same from the parallel processor 1.

In the next horizontal periods k+4 and k+5 and the horizontal period k+6 not illustrated in the figures, as shown in FIG. 4E, the read pointer signal RPA input to (S162) is asserted via the selector (SWP) 162 of the first parallel processor 10. This read pointer signal RPA is sequentially given a delay of exactly a time during which the result of processing corresponding to one pixel value D$_p$ is sequentially output by the individual delay element (Gp) 202$_p$.

In the horizontal periods k+4 and k+5 and the horizontal period k+6 not illustrated in the figures, when the output signal of the individual delay element (Gp) 202$_p$ is asserted, as shown in FIG. 4I, the corresponding selectors (Vp) 126$_p$ are sequentially closed, and the second results of processing (Q$_i$), (Q$_i$') and (Q$_i$") are sequentially read from the register (Rp) 206$_p$ and are output to the output terminal OUTT.

Below, the first operation of the parallel processor 1 will be further explained referring to FIGS. 5A and 5B. Note that, the horizontal periods k+3 and k+4 in the horizontal periods k, k+1, . . . , k+4 shown in [T1], [T3], . . . , [T9] of FIG. 5A and the horizontal blanking periods k+2, k+3, and k+4 in the horizontal blanking periods k, k+1, . . . , k+4 shown in [T2], [T5], . . . , [T10] of FIG. 5B coincide with the horizontal blanking periods k+2, k+3, and k+4 shown in FIG. 4A.

First, in the horizontal periods k, k+1, . . . , k+4 shown in [T1], [T3], [T5], [T7] and [T9], as shown in the processing of [S11], [S13], [S16], [S22], and [S29] of FIG. 5A, the pixel values D$_i$, D$_i$', . . . , D$_i$'" are sequentially input from the input terminal INT of the first parallel processor 10 and stored in the register (Ri) 106$_i$.

The pixel values D$_i$, D$_i$', . . . , D$_i$'" stored in the register (Ri) 106$_i$ are read from the register (Ri) 106$_i$ to the register (RiO) 108$_i$ in the horizontal blanking periods k, k+1, . . . , k+4 shown in [T2], [T4], [T6], [T8], and [T10] in the processing of [S12], [S15], [S20], [S27], and [S35] of FIG. 5A.

Further, the pixel values D$_i$, D$_i$', . . . , D$_i$'" stored in the register (RiO) 108$_i$ are subjected to the first processing by the individual processor 100$_i$ of the first parallel processor 10 in the horizontal periods k+1, . . . , k+4 shown in [T3], [T5], [T7], and [T9] in the processing of [S14], [S18], [S24], and [S31] of FIG. 5A and become the first results of processing Q$_i$, Q$_i$', Q$_i$" and Q$_i$'".

The first results of processing Q$_i$, Q$_i$', Q$_i$, Q$_i$", and Q$_i$'" are stored in the register (Ri) 0112$_i$ of the first parallel processor 10 and, in the horizontal periods k+2, k+3, and k+4 shown in [T5], [T7], and [T9], sequentially read from the register (RIO) $112_i$ as shown in the processing of [S17], [S23], and [S30] of FIG. 5A and output via the selector (Sin) 164 of the first parallel processor 10 to the second parallel processor 20.

The first results of processing $Q_i$, $Q_i'$, and $Q_i''$ input to the second parallel processor 20 are stored in the register (Rp) $206_p$ of the second parallel processor 20 as shown in the processing of [S19], [S25], and [S32] of FIG. 5B in the horizontal periods k+2, k+3, and k+4 shown in [T5], [T7], and [T9].

The first results of processing $Q_i$, $Q_i'$, and $Q_i''$ stored in the register (Rp) $206_p$ are read from the register (Rp) $206_p$ to the register (Rp0) $208_p$ as shown in the processing of [S21], [S28], and [S36] of FIG. 5B in the horizontal blanking periods k+2, k+3, and k+4 shown in [T6], [T8], and [T10].

The first results of processing $Q_i$ and $Q_i'$ read to the register (Rp0) $208_p$ are subjected to the second processing by the individual processor $200_p$ as shown in the processing of [S26] and [S34] of FIG. 5B in the horizontal periods k+3 and k+4 shown in [T7] and [T9] of FIG. 4 and stored as the second results of processing ($Q_i$) and ($Q_i'$) in the register (Rp2) $212_p$.

The second results of processing ($Q_i$) and ($Q_i'$) stored in the register (Rp2) $212_p$ are subjected to the second processing by the individual processor $200_p$ as shown in the processing of [S26] and [S34] of FIG. 5B in the horizontal periods k+3 and k+4 shown in [T7] and [T9] and stored in the register (Rp2) $212_p$.

The second results of processing ($Q_i$) and ($Q_i'$) stored in the register (Rp2) $212_p$ are read from the register (Rp2) $212_p$ as shown in the processing of [S28] and [S36] of FIG. 5B in the horizontal blanking periods k+3 and k+4 shown in [TS] and [T10] and stored in the register (Rp) $206_p$.

The second result of processing ($Q_i$) stored in the register (Rp) $206_p$ is output to the output terminal OUTT of the second parallel processor 20 from the register (Rp) $206_p$ as shown in the processing of [S33] of FIG. 5B in the horizontal period k+4 shown in [T9].

The explanation of the first operation of the parallel processor 1 of the present invention is ended above.

Below, an explanation will be made of the second operation of the parallel processor I of the present invention referring to FIGS. 6A to 6I and FIG. 7.

FIGS. 6A to 6I are graphs explaining the timing of the second operation of the parallel processor 1 of the present invention shown in FIG. 2 and FIG. 3, in which FIG. 6A indicates a pixel value $D_i$ input from the input terminal INT of the first parallel processor 10; FIG. 6B indicates the waveform of the write pointer signal WP input from the input terminal WPT of the first parallel processor 10; FIG. 6C indicates the waveform of the output signal of the individual delay element (H1) $104_1$; FIG. 6D indicates the waveform of the output signal of the individual delay element (H2) $104_2$; FIG. 6E indicates the waveform of the output signal of the individual delay element (Hn) $104_n$; FIG. 6F indicates the waveform of the output signal of the individual delay element (Hn+1) $104_{n+1}$; FIG. 6G indicates the waveform of the output signal of the individual delay element (Hn+2) $104_{n+2}$; FIG. 6H indicates the waveform of the output signal of the individual delay element (Hn+2) $104_m$; and FIG. 6I indicates the results of processing $Q_i$ and $Q_p$ output from the output terminal OUTT of the second parallel processor 20.

Figure 7:
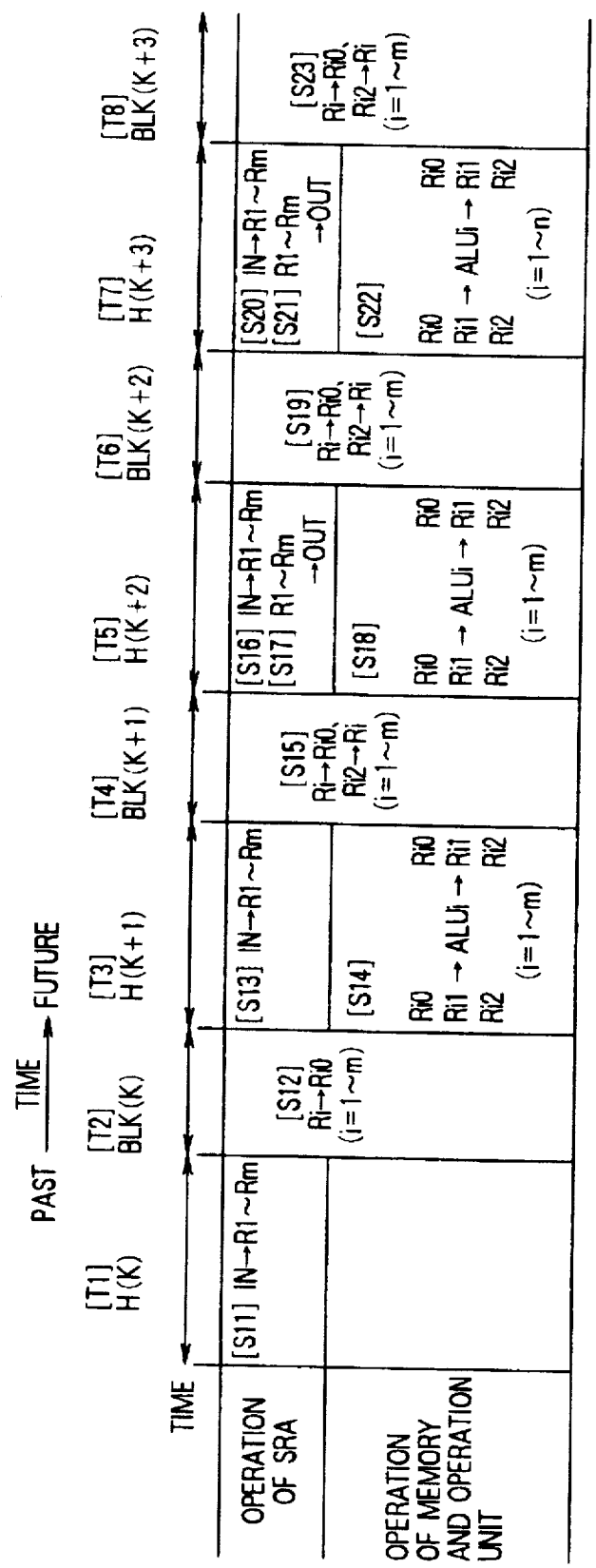
FIG. 7 is a view explaining the content of second processing of the parallel processor of the present invention shown in FIG. 2 and FIG. 3.

FIG. 7 is a view explaining the content of the second processing of the parallel processor 1 of the present invention shown in FIG. 2 and FIG. 3.

The second operation of the parallel processor 1 is an operation connecting the first parallel processor 10 and the second parallel processor 20 to form an integral parallel processor apparatus and processing the video signal of the HDTV system comprised of data of m length. Note that in FIG. 7, for simplification of the illustration, the names of the parts of the second parallel processor 20 are omitted.

In the second operation of the parallel processor 1, the selector (SRP) 160 of the first parallel processor 10 selects the contact point b side shown in FIG. 2 and outputs the output signal of the individual delay element (Gn) $102_n$ to the second parallel processor 20; the selector (SWP) 162 selects the contact point b side shown in FIG. 2 and outputs the output signal of the individual delay element (Hn) $104_n$ to the second parallel processor 20; the (Sin) 164 selects the contact point a side shown in FIG. 2 and outputs the pixel value $D_i$ input from the input terminal INT as it is to the second parallel processor 20; the switch (Sour) 166 is closed and the signal output from the register (Ri) $106_i$ is output to the second parallel processor 20; and the selector (SX) 168 selects the contact point a side shown in FIG. 2 and outputs the signal input from the data bus $X_n$ to the arithmetic and logic unit (ALUn) $814_n$.

Also, the selector SY 260 of the second parallel processor 20 selects the contact point a side shown in FIG. 3 and outputs the signal from the data bus $Y_{n+1}$ to the arithmetic and logic unit (ALUn+I) $214_{n+1}$. By the set up of the above first parallel processor 10 and the respective switches and selectors of the first parallel processor 10, the shift register (SPa) 12 and the shift register (SRB) 22 are connected, the transmission and reception of the data between the arithmetic and logic unit (ALUn) $114_n$ and the arithmetic and logic unit (ALUn+1) $214_{n+1}$ become possible, and further the address decoders 150 and 250 and the control circuits 152 and 252 perform the same operation, whereby it becomes possible for the first parallel processor 10 and the second parallel processor 20 to integrally operate.

As shown in the processing of [811] of FIG. 7 in the horizontal period k shown in FIG. 6A and FIG. 7 [T1], the pixel value $D_i$ of the video signal of the horizontal period k is serially input from the input terminal INT of the first parallel processor 10. Also, simultaneously with input of the first pixel value $D_i$ to the input terminal INT, as shown in FIG. 6B, the read pointer signal RPA is asserted and input to the input terminal RPAT.

As shown in FIGS. 6C to 6H, the read pointer signal RPA is given a delay by the individual delay element (Gi) $102_i$ of the first parallel processor 10 and the individual delay element (Gp) $202_p$ of the second parallel processor 20 whenever the pixel value $D_i$ is input to the input terminal RP, and the resultant data is supplied to the switch (Ui) $116_i$ of the first parallel processor 10 and the switch (Up) $216_p$ of the second parallel processor 20.

The switch (Ui) $116_p$ and the switch (Up) $216_p$ are closed where the output signals of the individual delay elements (Gi) $102_i$ and $202_p$ are asserted and write the pixel value $D_p$ in the corresponding register (Ri) $106_i$ of the corresponding first parallel processor 10 and the register (Rp) $206_p$ of the second parallel processor 20. Accordingly, as shown in the processing of FIG. 7, at the end of the horizontal period k, the pixel values $D_i$ and $D_p$ of the horizontal period k are stored in all registers (Ri) $106_i$ and registers (Rp) $206_p$ respectively, and the pixel values $D_i$ and $D_p$ of one line's (1H) worth of the video signal of the HDTV system are stored in the shift register (SRA) 12 and the shift register (SRB) 22 as a whole.

Next, as shown in the processing of [S11] of FIG. 7 in the horizontal period k shown in FIG. 7 [T1], the control circuits 152 and 252 generate the predetermined address signals ADRSA and ADRSB, assert the read signals RWA and RWB and the write signals WWOA and WWOB in the address decoders 150 and 152, and control the switches (Ti) $128_i$, switch (Tp) $228_p$, the switch (SiO) $120_i$, and switch (Sp0) $220_p$ to close them.

From the above operation, the reading and writing of the data with respect to the registers of the register groups $14_i$ and $24_p$ of the first parallel processor 10 and the second parallel processor 20 become possible.

Next, as shown in the processing of [S13], [S13], and [S14] of FIG. 7 in the horizontal period k+1 shown in [T3] of FIG. 7, the control circuits 152 and 252 produce the predetermined address signal ADRS, assert the read signals RWOA, RWiA, RW2A, RWOB, RW1B, and RW2B and write signals WWOA, WWIA, WW2A, WWOB, WWIB, and WW2B in the address decoders 150 and 250 to close the switches (Sij) $120_i$, $122_i$, and $124_i$, switches (Spj) $220_p$, $222_p$, and $224_p$, and switches (Tij) $140_i$, $142_i$, and $144_i$ and switches (Tpj) $240_p$, $242_p$, and $244_p$, and enable the reading and writing of the registers (Rij) $108_i$, $110_i$, and $112_i$ and registers (Rpj) $208_p$, $210_p$, and $212_p$ by the arithmetic and logic unit (ALUi) $114_i$ and the arithmetic and logic unit (ALUp) $214_p$.

Also, as shown in the processing of [S13] of FIG. 7, the control circuits 152 and 252 make the register (Ri) $106_i$ and register (Rp) $206_p$ store the pixel value $D_i$ of the horizontal period k+1 input from the input terminal INT similar to the horizontal period k also in the horizontal period k+1. Simultaneously, as shown in the processing of [S14] of FIG. 7, the control circuits 152 and 252 control the arithmetic and logic unit (ALUi) $114_i$ and the arithmetic and logic unit (ALUp) $214_p$, perform the processing by using the data stored in the registers (Rij) $108_i$, $110_i$, and $112_i$ and the registers (Rpj) $208_p$, $210_p$, and $212_p$, and return the result of processing $Q_i$ thereof to the register (Ril) $110_i$ and the register (Rp1) $210_p$.

Next, as shown in the processing of [S15] of FIG. 7 in the horizontal blanking period k+1 shown in FIG. 7 [T4], the control circuits 152 and 252 generate the predetermined address signals ADRSA and ADRSB, assert the read signals RWiA and RWIB and the write signals WWA and WWB in the address decoders 150 and 152, and make them close the switches (Tij) $142_i$, switch (Tpj) $242_p$, the switch (Ti) $128_i$, and switch (Tp) $128_p$. Subsequently, the control circuits 152 and 252 control the arithmetic and logic unit (ALUi) $114_i$ and the arithmetic and logic unit (ALUp) $214_p$ to make the same record the results of processing $Q_i$ and $Q_p$ stored in the register (Ri1) $110_i$ and the register (Rp1) $210_p$ in the register (Ri) $106_i$ and the register (Rp) $206_p$ via the read bit lines RBi and RBp, arithmetic and logic unit (ALUi) $114_i$, arithmetic and logic unit (ALUp) $214_p$, and the write bit lines WBi and WBp.

Next, in the horizontal period k+2 shown in [T5] of FIG. 7, as shown in the processing of [S16], [S17], and [S18] of FIG. 7, similar to that in the horizontal period k, the read pointer signal RPA is asserted in the input terminal RPAT, which is sequentially given the delay by the individual delay element (Gi) $102_i$ and the individual delay element (Gp) $202_p$, and supplied to the switch (Vi) $126_i$ and the switch (Vp) $126_p$. The switch (Vi) $126_i$ and the register (Vp) $126_p$ sequentially output the results of processing $Q_i$ and $Q_p$ stored in the register (Ri) $106_i$ and the register (Rp) $206_p$ to the output terminal OUTT of the second parallel processor 20. Accordingly, as shown in FIG. 6I, one line's worth of the results of processing $Q_i$ and $Q_p$ of the individual processors $100_i$ and $200_p$ are sequentially serially output from the output terminal OUTT by the same data rate as that for the pixel values $D_i$ and $D_p$. Further, in the horizontal blanking periods k+2 and k+3 and horizontal period k+3 shown in [T6] to [T8] of FIG. 7, as shown in the processing of [S19] to [S22] of FIG. 7, also for the pixel values $D_i$ and $D_p$ input to the parallel processor 1 in horizontal periods k+1, k+2, . . . . . , the above-mentioned respective processings are carried out in the parallel processor 1, and the results of processing $Q_i$ and $Q_p$ thereof are sequentially output from the output terminal OUTT.

The parallel processor 1 of the present invention as mentioned above treats the first parallel processor 10 and the second parallel processor 20 as a connected integral parallel processor apparatus of the SIMD system as mentioned above as the second operation, whereby a signal comprised of data of a length that cannot be processed if each of the first parallel processor 10 and the second parallel processor 20 is constituted solely, for example, a video signal of the HDTV system, can be processed.

Also, the parallel processor i of the present invention treats the first parallel processor 10 and the second parallel processor 20 as two independent parallel processor apparatuses of the SIMD system which are connected in series as mentioned above as the first operation and thereby is able to perform complexer and higher speed progressing in comparison with the conventional parallel processor apparatus for a signal comprised of data of a length which can be processed by the first parallel processor 10 and the second parallel processor 20 solely, for example, a video signal of the NSTC system, by pipeline processing.

Accordingly, according to the parallel processor i of the present invention, the processing of signals comprised of data of different lengths, such as the pixel data included in one horizontal period of video signals of for example the NSTC system and HDTV system, can be performed by the same apparatus. In addition, processing utilizing the overhead of the processing which has been produced in the conventional parallel processor apparatus is possible. Therefore the hardware resources are not left idle no matter what signal is processed. Also, the configuration of the apparatus can be changed in accordance with the contents of the processing, and therefore it is highly used for general purpose applications.

Note that, the constituent elements in the parallel processor 1 shown in the first embodiment can be replaced by the other constituent elements having an equivalent function. For example, the shift register (SRA) 12 and the shift register (SRB) 24 can be replaced by two shift registers for the data input and data output. Also, where the parallel processor i is made to perform the second operation, it is also possible to constitute the apparatus so that all of the address decoders 150 and 250 and control circuits 152 and 252 are shared by the first parallel processor 10 and the second parallel processor 20.

Also, the waveforms of the signals, the polarity of the logical values of the signals, timing, etc. in the parallel processor 1 shown in the first embodiment are examples. For example, in the parallel processor 1, in the horizontal blanking periods, the constitution was made so as to merely perform data transfer between the register (Ri) $106_i$ and the register (Rp) $206_p$ and the register groups $14_i$ and $24_p$, but other than this, it is also possible to constitute the same so as to perform processing with respect to substantial signals.

Moreover, the signal which is processed by the parallel processor i is not restricted to the above-mentioned video signal. It is also possible to use for example a voice signal or various types of data serially sent on a transmission line as the object of the processing.

Moreover, it is also possible for the control circuits 152 and 252 to automatically detect whether the pixel value $D_i$ which has been input thereto is of the NTSC system or HDTV system and automatically change the connections between the first parallel processor 10 and the second parallel processor 20 in accordance with this.

SECOND EMBODIMENT

Below, a parallel processor 3 of the present invention will be explained as an example of a modification of the parallel processor 1 shown in the first embodiment, with reference to FIG. 8 and FIG. 9.

Figure 8:
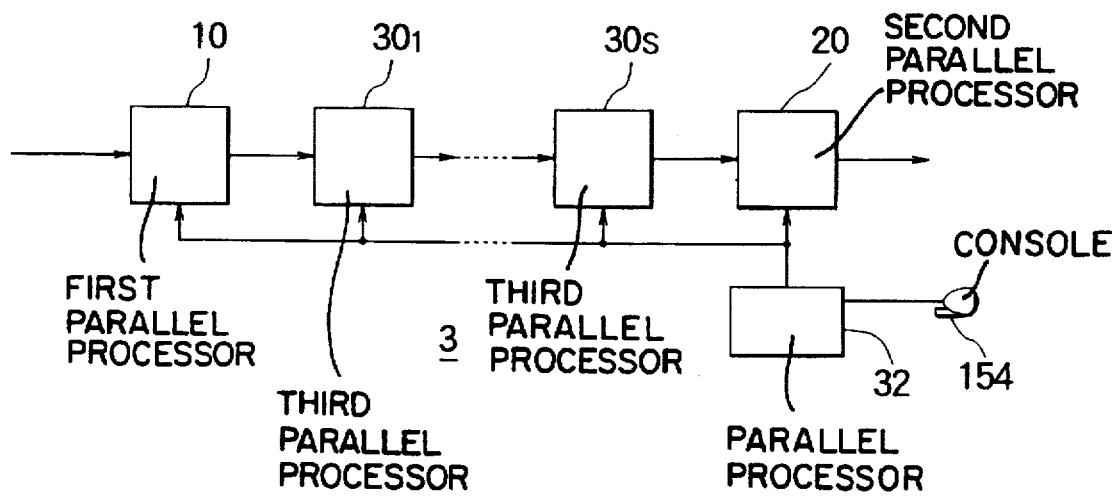
FIG. 8 is a view of the configuration of the parallel processor according to a second embodiment of the present invention.

FIG. 8 is a view showing the configuration of the parallel processor 3 according to the second embodiment of the present invention. FIG. 9 is a view showing the configuration of a third parallel processor $30_r$ shown in FIG. 8.

First, the configuration of the parallel processor 3 of the present invention will be explained by referring to FIG. 8.

As shown in FIG. 8, the parallel processor 3 is configured with s number (s=1, 2, . . . , the same for the following) of third parallel processors 30 having a similar structure to those of the first parallel processor 10 and the second parallel processor 20 are connected in series between the first parallel processor 10 and the second parallel processor 20 in the parallel processor 1, and further a parallel processor control circuit 32 controlling the connections among the first parallel processor 10, the second parallel processor 20, and the third parallel processor 30 is provided.

Figure 9:
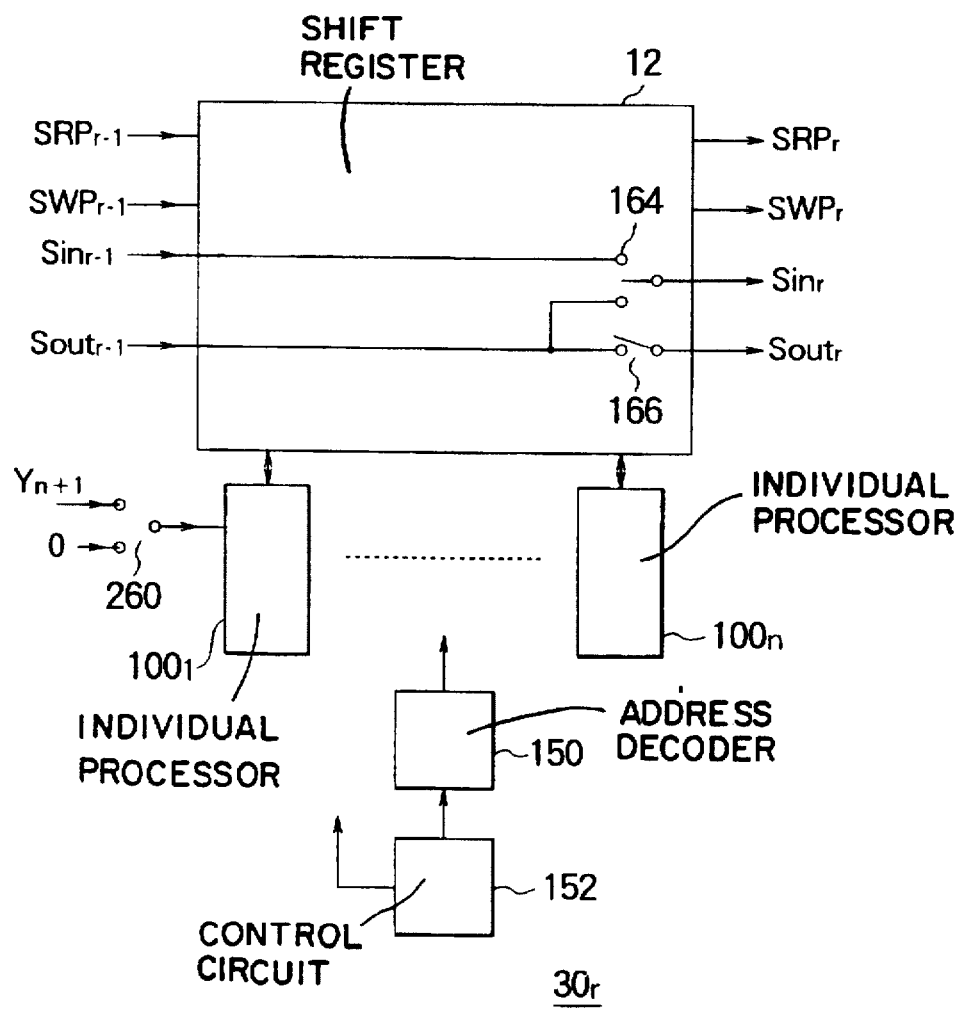
FIG. 9 is a view of the configuration of the third parallel processor shown in FIG. 8.

Note that, in FIG. 8, for simplification of the illustration, the connection among the first parallel processor 10, the second parallel processor 20, and the third parallel processor 30 is indicated by one line, but in actuality, these parallel processors perform the transmission and reception of a plurality of signals as shown in FIG. 2, FIG. 3, and FIG. 9.

Next, the configuration of the third parallel processor $30_r$ (r=2, 3, . . . , s−1, the same for the following) will be explained referring to FIG. 9. Note that, in FIG. 9, among the constituent elements of the third parallel processor $30_r$, those which are common to those of the first parallel processor 10 and the second parallel processor 20 are suitably omitted. The constituent elements of the third parallel processor $30_r$ which are not explained here are the same as the constituent elements of the first parallel processor 10 and the second parallel processor 20 shown in FIG. 2 and FIG. 3.

As shown in FIG. 9, the third parallel processor $30_r$ has the individual processor $100_i$ of the first parallel processor 10, the shift register (SPA) 12, address decoder 150, and the control circuit 152.

Further, the third parallel processor $30_r$ accepts signals $SRP_{r-1}$, $SWP_{r-1}$, $S_{r-1}$, and $Sout_{r-1}$ from the first parallel processor 10 or third parallel processor $30_{r-1}$ of the previous stage and input signal from the data bus $Y_{n-1}$ for the connection with the other processors, and therefore the signal input part thereof has the same structure as that of a corresponding part of the second parallel processor 20. Also, it outputs the signal to the third parallel processor $30_{r+1}$ of the next stage as in the second parallel processor 20, and therefore the signal output part thereof has the same structure as the corresponding part of the first parallel processor 10.

According to the parallel processor 3, where a signal comprised of data of a very short length are subjected to processing, the parallel processors are independently used and made to perform the pipeline processing of (s+2) stages. Where a signal comprised of data of a medium length is to be subjected to the processing, several stages of the first parallel processor 10, second parallel processor 20, and third parallel processor $30_r$ are connected, whereby parallel processing can be performed for the respective signals, and further pipeline processing of several stages can be performed. Further, for a signal comprised of data of a long length, the parallel processing can be carried out for a signal comprised of data of the longest length (s+m) by connecting all parallel processors constituting the third parallel processor $30_r$.

A case where a signal comprised of data of a medium degree of length mentioned above is subjected to the processing will be concretely explained.

In the configuration of the parallel processor 3, where a signal comprised of data of a length of n (h−1) or more or nh or less is to be processed, an h number of each of the first parallel processors 10, second parallel processors 20, and third parallel processors $30_r$ are connected, for example, the first parallel processors 10 and the third parallel processors $30_1$ to $30_{h-1}$, the third parallel processors $30_h$ to $30_{2h-1}$, and the third parallel processors $30_{2h}$ to $30_{2h-1}$, . . . (note, h=1, 2, . . . , m−2n), and are made to operate similarly to the first operation of the parallel processor I shown in the first embodiment as a series of parallel processor apparatuses, whereby they are made to perform the processing for signals comprised of data of a length of n (h−1) or more and nh or less. Further, they are made to perform the second operation of the parallel processor I shown in the first embodiment between the third parallel processor $30_{h-1}$ and the third parallel processor $30_h$, whereby this one series of parallel processor apparatuses is made to perform the pipeline operation.

The control of the connection among the first parallel processor 10, second parallel processor 20, and the third parallel processor 30 described above is carried out by having the parallel processor control circuit 32 set up the connection of the selector (SRP) 160, selector (SWP) 162, selector (Sin) 164, selector (SX) 168, selector (SY) 260, and the switch (Sour) 166 with respect to the respective control circuits 152 and 252 according to the setting of for example the console 154.

Accordingly, according to the parallel processor 3, it is possible to make active use of the characteristic of the parallel processor apparatus of the present invention of general applicability with respect to different lengths of data even more than with the parallel processor 1.

In the parallel processor 3, by constituting the third parallel processor $30_r$, the first parallel processor 10, and the second parallel processor 20 by multiple stages as shown in FIG. 8, a larger number of signals comprised of data of different lengths can be processed with a high efficiency and in addition without idle hardware resources.

The structure and operation of the parallel processor apparatus of the present invention shown in respective embodiments mentioned above are examples. For example, various configurations can be adopted as modifications of the first embodiment.

According to the parallel processor apparatus of the present invention mentioned above, where the related parallel processor apparatus performs the processing of the signal having a small data number which becomes the unit for processing among a plural types of signals to be processed, a processing having a good efficiency can be carried out by using remaining individual processors among the individual processors provided corresponding to the signal having the largest data number, and therefore the effective utilization of the hardware resources can be attempted.

Also, where the data number which becomes the unit for processing is the same, more complex and higher degree processing than those by the conventional apparatus can be carried out.

What is claimed is:

1. A parallel processor apparatus performing processing on periodic input signals comprised of data of different lengths per period, said parallel processor apparatus, comprising:

a plurality of individual processing unit groups, each of said individual processing unit groups being provided with a respective predetermined number of individual processing units operable to perform processing on data having different lengths per period;

said processing unit groups being configured so that the individual processing units of said plurality of processing unit groups are connected in series to enable processing of data having a first length per period by connecting in series said plurality of individual processing unit groups so that each of said plurality of individual processing units of said plurality of individual processing unit groups processes data of a period of said data having said first length per period; and said processing unit groups being configured so that the individual processing units of a first of said processing unit groups processes data having a second length per period to produce first processed data, and the individual processing units of a second of said processing unit groups processes said first processed data to produce second processed data.

2. A parallel processor apparatus as set forth in claim 1, wherein each of said processing units of said first of said processing unit groups processes every period of said data having said second length per period; and said first of said processing unit groups outputs the result of the processing to the second of said processing unit groups.

3. A parallel processor apparatus as set forth in claim 2, wherein said plurality of processing units divide a desired processing among them and each perform one part thereof so that said plurality of processing units as a whole perform said desired processing.

4. A parallel processor apparatus as set forth in claim 1, wherein said individual processing unit is configured so as to enable an exchange of data with the adjoining individual processing units.

5. A parallel processor apparatus as set forth in claim 1, wherein each of said individual processing units includes:

a register and a processor;

said register stores data of an input signal input at a first timing of each period of said input signal or stores results of processing of said individual processing units of a previous stage and outputs said stored data to said processor at a second timing after said first timing of each said period of said input signal;

said processor processes at the first timing of subsequent period after said register stores said data and outputs the result of said processing to said register at the second timing of said subsequent period; and said register successively outputs the results of said processing so as to follow the output of the result of the processing of the register of the previous stage.

6. A parallel processor apparatus as set forth in claim 5, wherein said input signal comprises a video signal of a serial format; the data of said video signal is pixel data of the pixels of one horizontal period's worth of said video signal; the first timing of said period is one horizontal period; and the second timing of said period is one horizontal blanking period.

7. A parallel processor apparatus comprising:

a plurality of first shift register circuits which sequentially shift the input data of a serial format and convert the same to data of a parallel format;

a plurality of processing circuits which respectively perform predetermined processing with respect to the data of a parallel format and output the same as data of a parallel format;

a second shift register circuit which sequentially shifts the data output from said processing circuits, converts the same to data of a serial format, and outputs the resultant data; and a selector circuit which inputs at least one part of the data output from said second shift register circuit to corresponding first shift register circuits.

8. A parallel processor apparatus comprising:

a plurality of first shift register circuits which sequentially shift first serial data of a serial format and convert the same to first parallel data of a parallel format, and sequentially shift second parallel data and convert the same to second serial data of a serial format;

a plurality of processing circuits which respectively perform predetermined processing with respect to the first parallel data of a parallel format and output the same as third parallel data of a parallel format; and a selector circuit which inputs at least one part of said second serial data output from said first shift register circuits to corresponding said first shift register circuits, said third parallel data being input to said first shift register circuits, as said second parallel input data.

* * * * *